(12) United States Patent
Arazaki

(10) Patent No.: US 7,681,975 B2
(45) Date of Patent: Mar. 23, 2010

(54) PRINTING DEVICE, PRINTING DEVICE CONTROL PROGRAM AND METHOD, AND PRINTING DATA GENERATION DEVICE, PROGRAM, AND METHOD

(75) Inventor: Shinichi Arazaki, Shimosuwa (JP)

(73) Assignee: Seiko Epson Corporation (JP)

( * ) Notice: Subject to any disclaimer, the term of this patent is extended or adjusted under 35 U.S.C. 154(b) by 604 days.

(21) Appl. No.: 11/338,484

(22) Filed: Jan. 24, 2006

(65) Prior Publication Data
US 2006/0192812 A1 Aug. 31, 2006

(30) Foreign Application Priority Data
Jan. 25, 2005 (JP) .............................. 2005-016490
Sep. 28, 2005 (JP) .............................. 2005-282162

(51) Int. Cl.
B41J 2/205 (2006.01)
B41J 29/38 (2006.01)
B41J 29/393 (2006.01)
B41J 2/15 (2006.01)
B41J 2/21 (2006.01)

(52) U.S. Cl. ............................... 347/15; 347/9; 347/19; 347/41; 347/43

(58) Field of Classification Search ................... 347/15, 347/9, 19, 41, 43
See application file for complete search history.

(56) References Cited

U.S. PATENT DOCUMENTS 6,283,571 B1 9/2001 Zhou et al.
6,293,643 B1 9/2001 Shimada et al.
6,328,404 B1 12/2001 Fujimori (Continued)

FOREIGN PATENT DOCUMENTS

JP 01-235655 9/1989

(Continued)

Primary Examiner—Matthew Luu
Assistant Examiner—Jannelle M Lebron
(74) Attorney, Agent, or Firm—Harness, Dickey & Pierce, P.L.C.

(57) ABSTRACT

A printing device that prints an image by forming a dot formation pattern on a printing medium in accordance with image data of a printing object using a printing head that includes a plurality of nozzles each being capable of forming dots to the printing medium. The printing device includes: an image data acquisition unit that acquires the image data showing pixel values of M (M≧2) for the image; a dot formation pattern data storage unit that stores banding avoiding dot formation pattern data for forming a dot formation pattern for banding avoidance use that includes the dots each being correlated to information about any of the nozzles relating to a banding problem; a printing data generation unit that generates printing data as a result of converting the image data into dot formation pattern data for use of forming a printing image of the image data on the printing medium; and a printing unit that prints, based on the printing data, the printing image of the image data onto the printing medium using the printing head. In the printing device, based on the image data, and the dot formation pattern data stored in the dot formation pattern data storage unit, the printing data generation unit generates the printing data by replacing data in the image data about the dots taken charge by the nozzle relating to the banding problem with the banding avoiding dot formation pattern data for the nozzle.

12 Claims, 19 Drawing Sheets

U.S. PATENT DOCUMENTS

| | | |
|---|---|---|
| 6,908,176 B2 | 6/2005 | Koitabashi et al. |
| 2003/0085939 A1 | 5/2003 | Koitabashi et al. |

FOREIGN PATENT DOCUMENTS

| | | |
|---|---|---|
| JP | 05-030361 | 2/1993 |
| JP | 05-092559 | 4/1993 |
| JP | 05-269990 | 10/1993 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |
| JP | 2002-019101 | 1/2002 |
| JP | 2003-063043 | 3/2003 |
| JP | 2003-136702 | 5/2003 |

EXEMPLARY DOT SIZES IN QUARTERIZATION

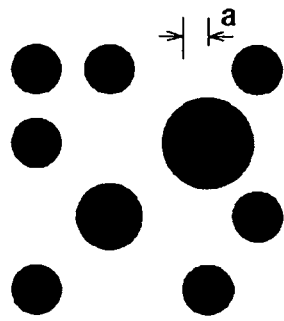
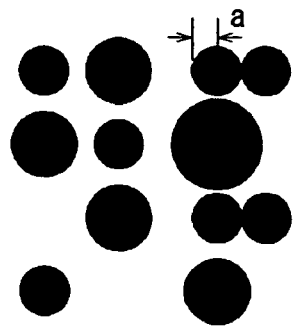

FIG.9A  FIG.9B

```
          ↓ PART WHERE              ↓ PART WHERE
            BANDING PROBLEM           BANDING PROBLEM
            IS OBSERVED               IS OBSERVED
    ┌─────────────┐           ┌─────────────┐
    │  PATTERN    │           │  PATTERN    │
    │   WITH      │           │   WITH      │
    │  DENSITY    │           │  DENSITY    │
    │VALUE OF 63  │           │VALUE OF 95  │
    ├─────────────┤           └─────────────┘
    │  PATTERN    │
    │   WITH      │
    │  DENSITY    │           ┌─────────────┐
    │VALUE OF 63  │           │  PATTERN    │
    ├─────────────┤           │   WITH      │
    │  PATTERN    │           │  DENSITY    │
    │   WITH      │           │VALUE OF 95  │
    │  DENSITY    │           └─────────────┘
    │VALUE OF 63  │
    ├─────────────┤           ┌─────────────┐
    │  PATTERN    │           │  PATTERN    │
    │   WITH      │           │   WITH      │
    │  DENSITY    │           │  DENSITY    │
    │VALUE OF 63  │           │VALUE OF 95  │
    ├─────────────┤           └─────────────┘
    │  PATTERN    │
    │   WITH      │           ┌─────────────┐
    │  DENSITY    │           │  PATTERN    │
    │VALUE OF 63  │           │   WITH      │
    └─────────────┘           │  DENSITY    │
                              │VALUE OF 95  │
                              └─────────────┘
```

FIG.10A  FIG.10B

PRINTING DEVICE, PRINTING DEVICE CONTROL PROGRAM AND METHOD, AND PRINTING DATA GENERATION DEVICE, PROGRAM, AND METHOD

RELATED APPLICATIONS

This application claims priority to Japanese Patent Application Nos. 2005-016490 filed Jan. 25, 2005 and 2005-282162 filed Sep. 28, 2005 which are hereby expressly incorporated by reference herein in their entirety.

BACKGROUND

1. Technical Field

The present invention relates to a printing device for use with printers of facsimile machines, copying machines, OA equipment, and others, and a printing device control program and method. More specifically, the invention relates to a printing device suitable for printing with a so-called ink jet technology, and capable of text and image rendering onto a printing paper (printing material) through discharge of liquid ink particles of various colors, a control program and method for such a printing device, and a printing data generation device, program, and method.

2. Related Art

Described below is a printing device, specifically a printer of an ink jet type (hereinafter, referred to as "ink jet printer").

With the reason of relatively inexpensive price and the ease of achieving high-quality color printing, an ink jet printer has become widely popular not only for office use but also for personal use with the spread of personal computers, digital cameras, and others.

Such an ink jet printer generally performs text and image rendering on a printing medium (paper) using a moving element in a predetermined manner so that any desired printing is achieved. More in detail, the moving element referred to as carriage includes an ink cartridge and a printing head as a piece, reciprocating on the printing medium in the direction perpendicular to the paper feeding direction, and discharging (ejecting) liquid ink droplets in dots from the nozzles provided to the printing head. If the carriage is provided with ink cartridges of four colors, i.e., black, yellow, magenta, and cyan, and their each corresponding printing head, full-color printing becomes possible in addition to monochrome printing by color mixture. Better still, the ink cartridges of six, seven, or eight colors additionally with light cyan, light magenta, and others are also in practical use.

There is a problem with such an ink jet printer of a type performing printing with the printing head reciprocating on the carriage in the direction perpendicular to the printing paper. That is, to derive a clearly-printed page, the printing head is required with frequent reciprocating movements, e.g., several tens to a hundred or more. This results in a drawback of a longer printing time compared with other types of printing device such as electrophotographic laser printers or others, e.g., copying machines.

On the other hand, with an ink jet printer of a type using no carriage but a long printing head having the same width as that of the printing paper or longer, there is no need to move the printing head in the width direction of the printing paper. This accordingly allows printing with a single scan, i.e., a single path, favorably leading to high-speed printing as can be with the laser printers. What is better, this eliminates the need for a carriage with a printing head, and a drive system for moving the carriage, thereby reducing the size and weight of the cabinet of the printer, and the noise to a considerable degree.

Note here that the ink jet printer of the former type is generally referred to as "multi-path printer", and the ink jet printer of the latter type as "line-head printer" or "serial printer".

The issue with such an ink jet printer is the manufacturing deviation observed in the printing head that serves an essential role for the printer. The manufacturing deviation is resulted from the configuration of the printing head, carrying very small nozzles of about 10 to 70 μm in diameter in a line at regular intervals, or in a plurality of lines in the printing direction. In such a configuration, the nozzle may be partially misaligned so that the ink discharge direction is incorrectly angled, or the nozzles may not be correctly disposed as they are expected to be so that the nozzles resultantly fail in forming dots at their ideal positions, i.e., causes so-called ink deflection. Because the nozzles often show a wide range of variation in the ink amount, if the variation is too much, the ink amount to be discharged from the nozzle is considerably large or small compared with the ideal amount of ink.

As a result, an image part printed by such a faulty nozzle suffers a printing failure, i.e., so-called banding (streaking) problem, resultantly reducing the printing quality considerably. More in detail, with ink deflection occurred, the dot-to-dot distance between dots formed by any adjacent nozzles becomes not uniform. When such a dot-to-dot distance is longer than usual, the corresponding part suffers from white streaks when the printing paper is white in color. When the dot-to-dot distance is shorter than usual, the corresponding part suffers from dark streaks. When the amount of ink coming from any of the nozzles is not ideal and is a lot, the part for the nozzle suffers from dark streaks, and when the amount of ink is little, the part suffers from white streaks.

Such a banding problem is often observed in "line head printers" in which a printing head or a printing medium is fixed, i.e., printing with a single path, compared with the above-described "multi-path printers" (serial printers). This is because the multi-path printers are adopting the technology of making the banding problem less noticeable utilizing the frequent reciprocating movements of the printing head.

For the purpose of preventing printing failures caused by the banding problem, research and development has been actively conducted from the hardware perspective, e.g., improving the manufacturing technology of the printing head, or improving the design thereof. However, from the perspective of manufacturing cost, the technology, or others, it is found difficult to provide a printing head perfectly free from the banding problem.

In consideration of the above, the currently-available technology for correcting the banding problem is adopting a so-called software technique such as printing control as below in addition to such improvements from the hardware perspective as described above.

As an example for such a technology, Patent Document 1 (JP-A-2002-19101) and Patent Document 2 (JP-A-2003-136702) describe the technology as a measure against the ink amount variation of the nozzles, and ink discharge failures. More in detail, parts of lower printing density are applied with shading correction so that any head variation is handled, and parts of higher printing density are provided with any substitution color, e.g., cyan or magenta for printing in black, so that the banding problem is corrected or any ink amount variation is made less noticeable.

Patent Document 3 (JP-A-2003-63043) describes the technology of generating filled-in images, i.e., images being solidly and completely filled, using all of provided nozzles. That is, for filled-in images, any nozzles in the vicinity of pixels in charge of any discharge-faulty nozzle(s) are increased in ink amount for discharge.

Patent Document 4 (JP-A-5-30361) describes the technology of preventing the banding problem with a process of feeding back any variation observed to the ink amount coming from the nozzles through error diffusion so that the variation is absorbed.

The concern here is that, with the technology of correcting the banding problem or reducing the variation of nozzles using substitution colors as related arts found in Patent Documents 1 and 2, any processed parts are changed in hue. In consideration thereof, such technologies are not suitable for printing required to be high in image quality and printing quality as color photograph printing.

Another issue is with the technology of allocating information about any discharge-faulty nozzles to right and left thereof to prevent white streaks in parts high in density. If this technology is applied to solve the above-described ink deflection problem, white streaks are actually reduced but the banding problem still remains unsolved in parts high in density.

The related art of Patent Document 3 causes no problem with printing subjects if they are filled-in images, but cannot be used if printing subjects are of halftone. The technology of using substitution colors may serve well for thin lines. However, if with an image of many colors, i.e., one color next to another, the technology also fails to solve the problem of hue change in the image.

The related art of Patent Document 4 also raises an issue of complicating the feeding-back process that is expected to be appropriately executed against the problem of not deriving ideal dot formation details, and such an issue is difficult to solve.

SUMMARY

An advantage of some aspects of the invention is to provide a printing device, a printing device control program and method, and a printing data generation device, program, and method, all of which are newly developed and capable of stopping image degradation or making image degradation less conspicuous that is caused by a banding problem resulted from ink deflection.

First Aspect

A first aspect of the invention is directed to a printing device that prints an image by forming a dot formation pattern on a printing medium in accordance with image data of a printing object using a printing head that includes a plurality of nozzles each being capable of forming dots to the printing medium. The printing device includes: an image data acquisition unit that acquires the image data showing pixel values of M ($M \geq 2$) for the image; a dot formation pattern data storage unit that stores banding avoiding dot formation pattern data for forming a dot formation pattern for banding avoidance use that includes the dots each being correlated to information about any of the nozzles relating to a banding problem; a printing data generation unit that generates printing data as a result of converting the image data into dot formation pattern data for use of forming a printing image of the image data on the printing medium; and a printing unit that prints, based on the printing data, the printing image of the image data onto the printing medium using the printing head. In the printing device, based on the image data, and the dot formation pattern data stored in the dot formation pattern data storage unit, the printing data generation unit generates the printing data by replacing data in the image data about the dots taken charge by the nozzle relating to the banding problem with the banding avoiding dot formation pattern data for the nozzle.

With such a configuration, the image data acquisition unit can acquire image data showing pixel values of M ($M \geq 42$) for an image. The dot formation pattern data storage unit can store banding avoiding dot formation pattern data for forming a dot formation pattern for banding avoidance use that includes the dots each being correlated to information about any of a plurality of nozzles relating to a banding problem. The printing data generation unit can generate printing data as a result of converting the image data into dot formation pattern data for use of forming a printing image of the image data on the printing medium. The printing unit can print, based on the printing data, the printing image of the image data onto the printing medium using the printing head.

Based on the image data, and the dot formation pattern data stored in the dot formation pattern data storage unit, the printing data generation unit can generate the printing data by replacing data in the image data about the dots taken charge by the nozzle relating to the banding problem with the banding avoiding dot formation pattern data for the nozzle.

Such a configuration accordingly enables to reduce the degradation of printing quality such as white and dark streaks caused by a banding problem, which is resulted from ink deflection due to nozzles whose dot formation positions are not ideal, or ink discharge failures, e.g., no ink is discharged from nozzles. What is better, the process for banding avoidance purpose can be performed at high speed, being a simple process of replacing dot formation pattern data for a portion suffering from the banding problem in N-valued image data with banding avoiding dot formation pattern data that is previously provided.

The expression of "dot" denotes a single region of a printing medium formed by an ink droplet discharged from one or more nozzles. This "dot" is not zero in area, is of a predetermined size (area), and is of various sizes. The dot formed by ink discharge is not necessarily be a perfect circle in shape, and may take any other shape such as an ellipse. If the resulting dots are not perfect circle but ellipse, for example, their dot diameter may be their average value. Alternatively, an equivalent dot is estimated for a perfect circle having the same area as a dot formed by a certain amount of ink, and the diameter of the estimated equivalent dot is dealt as the dot diameter. To form dots varying in density, various techniques are applicable, e.g., forming dots of the same size but of different density, forming dots of the same density but of different size, forming dots of different density by changing the discharge amount and frequency of ink of the same density, or others. If an ink droplet discharged from one specific nozzle is broken up before reaching the printing medium, the resulting dots are dealt as one dot. If two or more dots are merged together after being discharged from any two nozzles or from one specific nozzle after a time lag, the resulting dots are dealt as two dots. This is applicable to aspects of "printing device control program", "printing device control method", "printing data generation device", "printing data generation program", "printing data generation method", and "program-recorded recording medium", descriptions in the "description of exemplary embodiments", and others.

The image data acquisition unit acquires image data that is provided from a unit for reading optical printing results exemplified by a scanner unit or others. Such image acquisition is made also from any external device over a network such as LAN or WAN passively or actively, or from recording media such as CD-ROMs or DVD-ROMs via drives of its own printing device, e.g., CD drives or DVD drives, or from a storage device of its own printing device, for example. That is, the image acquisition at least includes data input, acquisition, reception, and reading. This is applicable to aspects of "printing device control program", "printing device control method", "printing data generation device", "printing data generation program", "printing data generation method", and "program-recorded recording medium", descriptions in the "description of exemplary embodiments", and others.

The expression of "banding problem" means a printing failure of white and dark streaks observed together in the printing result. This is resulted from so-called ink deflection due to nozzles varying in dot formation positions, and being not at their ideal positions. The "banding problem" also means a printing failure of white and dark streaks observed in the printing result due to ink discharge failures, e.g., no ink is discharged from the nozzles. This is applicable to aspects of "printing device control program", "printing device control method", "printing data generation device", "printing data generation program", "printing data generation method", and "program-recorded recording medium", descriptions in the "description of exemplary embodiments", and others.

The expression of "ink deflection" means a phenomenon in which, unlike the mere ink discharge failures occurred to some of the nozzles as described above, the nozzles have no problem for ink discharge but are partially misaligned so that the ink discharge direction is incorrectly angled, thereby failing in forming dots at their ideal positions. This is applicable to aspects of "printing device control program", "printing device control method", "printing data generation device", "printing data generation program", "printing data generation method", and "program-recorded recording medium", descriptions in the "description of exemplary embodiments", and others.

The expression of "white streaks" denotes the parts (regions) of a printing medium whose base appears streaky in color. This is due to the ink deflection, resultantly causing the dot-to-dot distance between any adjacent dots to be often wider than a predetermined distance. The expression of "dark streaks" denotes the parts (regions) of a printing medium whose base is not visible in color or looks relatively darker due to also the ink deflection, resultantly causing the dot-to-dot distance between any adjacent dots to be often narrower than the predetermined distance. The expression of "dark streaks" also denotes the parts (regions) of a printing medium that look streaky dark in color, caused by dots not formed at their ideal positions by being partially overlaid on dots formed at their normal positions. The white streaks may occur due to nozzles whose ink discharge amount is less than others, and the dark streaks may occur due to nozzles whose ink discharge amount is more than others. This is applicable to aspects of "printing device control program", "printing device control method", "printing data generation device", "printing data generation program", "printing data generation method", and "program-recorded recording medium", descriptions in the "description of exemplary embodiments", and others.

The expression of "any of the nozzles relating to the banding problem" denotes a nozzle(s) that is not at an ideal dot formation position and is a cause of ink deflection, and any other neighboring nozzles. When white streaks occur, for example, the corresponding nozzle(s) are those whose dot formation positions are not ideal, and those forming normal dots at their correct positions with a dot-to-dot distance wider than usual between the dots displaced in position. When the dark streaks occur, the corresponding nozzle(s) are those whose dot formation positions are not ideal due to ink deflection, and those forming dots at their correct positions with the dot-to-dot distance narrower than usual between the dots displaced in position, or those forming normal dots being partially or entirely overlaid on one another. These are not surely restrictive, and the neighboring range may be so widened as to include three adjacent nozzles to any corresponding nozzle(s) on its (their) both sides, for example. This is applicable to aspects of "printing device control program", "printing device control method", "printing data generation device", "printing data generation program", "printing data generation method", and "program-recorded recording medium", descriptions in the "description of exemplary embodiments", and others.

The expression of "banding avoiding dot formation pattern data" denotes, in a normal dot formation pattern for a nozzle relating to a banding problem, data for use of forming a dot pattern that enables dot formation depending on a distance to the nozzle whose dot formation position is not ideal or the nozzle causing ink discharge failure, and to dots formed by the nozzle or dots suffering from ink discharge failure. More in detail, for any parts showing such a distance wider than usual, the neighboring dots are to be formed bigger than usual, and for any parts showing the distance narrower than usual, the neighboring dots are to be formed smaller than usual or decimated. The resulting dot formation pattern formed by such data can effectively make less noticeable white and dark streaks caused by a banding problem. The data corresponds to image data through with an N-value process, for example. This is applicable to aspects of "printing device control program", "printing device control method", "printing data generation device", "printing data generation program", "printing data generation method", and "program-recorded recording medium", descriptions in the "description of exemplary embodiments", and others.

The "printing data" is generated by subjecting image data of M value ($M \geqq 2$) to an N-value process ($M>N \geqq 2$) using an error diffusion technique or others depending on the dot size possibly formed by the nozzles. The printing data includes information needed for dot formation, e.g., about whether or not to form dots using nozzles with respect to every pixel value of image data on a color basis. If dots are to be formed, the information tells also about dot size of large, medium, or small, for example. This is applicable to aspects of "printing device control program", "printing device control method", "printing data generation device", "printing data generation program", "printing data generation method", and "program-recorded recording medium", descriptions in the "description of exemplary embodiments", and others.

The printing data generation unit goes through a process of generating printing data by converting image data into dot formation pattern data, which is used to form a printing image of the image data onto a printing medium. Assuming that the image data acquired by the image data acquisition unit has a pixel value of 3 or more, the process is of converting the image data into data meeting the performance capability of the printing unit in consideration of the dot sizes possibly formed by the nozzles, e.g., an N-value ($M>N \geqq 2$) process. The process is also of replacing the dot formation pattern data relating to a banding problem in the before- or after-conversion image data with the banding avoiding dot formation pattern data. That is, the conversion includes a data conversion process that meets the performance capability of the printing unit, e.g., N-value process, and a replacement process of replacing the dot formation pattern data with other data. This is applicable to aspects of "printing device control program", "printing device control method", "printing data generation device", "printing data generation program", "printing data generation method", and "program-recorded recording medium", descriptions in the "description of exemplary embodiments", and others.

The expression of "data about dots taken charge by a nozzle relating to a banding problem" denotes image data if a replacement process is executed prior to image data processing, e.g., prior to the N-value process. The image data may be the one through with color conversion. The expression denotes processed image data if the replacement process is executed after image data processing, e.g., after the N-value process. The image data in this case is exemplified by dot formation pattern data. The determination factor for such timing is when the banding avoiding dot formation pattern data is disposed as a replacement. This is applicable to aspects of "printing device control program", "printing device control method", "printing data generation device", "printing data generation program", "printing data generation method", and "program-recorded recording medium", descriptions in the "description of exemplary embodiments", and others.

Second Aspect

According to a printing device of a second aspect, in the first aspect, the banding avoiding dot formation pattern data is generated on a dithering level basis, and based on a dithering level of the dot formation pattern for the image data including the dots taken charge by the nozzle relating to the banding problem, the printing data generation unit replaces data about the dot formation pattern with the dot formation pattern data for the dithering level.

Such a configuration enables to replace a replacing dot formation pattern with another for banding avoidance, having the same dithering level as that of an image configured by the replacing dot formation pattern. This leads to effects and advantages of preventing or reducing degradation of printing quality to be caused by the replacement process while avoiding a banding problem.

Third Aspect

According to a printing device of a third aspect, in the second aspect, when the dot formation pattern data storage unit is not storing the banding avoiding dot formation pattern data corresponding to the dithering level of the dot formation pattern for the image data including the dots taken charge by the nozzle relating to the banding problem, the printing data generation unit replaces the data about the dot formation pattern for the nozzle relating to the banding problem with two or more of the banding avoiding dot formation pattern data whose dithering levels are different.

Such a configuration enables to be ready for various possible dithering levels through combination of dot formation patterns varying in dithering level. This favorably eliminates the need to prepare dot formation pattern data for every dithering level, thereby favorably reducing the memory capacity needed for the dot formation pattern data.

The expression of "dots taken charge by the nozzle relating to the banding problem" denotes, for example, dots to be formed by the nozzle causing ink deflection, and dots to be formed by any other neighboring nozzles. Herein, the expression of "any other neighboring nozzles" denotes those taking in charge of dots of about 2 to 10 pixels around the dots formed by the nozzle causing ink deflection. Here, the number of pixels changes depending on the image resolution. This is applicable to aspects of "printing device control program", "printing device control method", "printing data generation device", "printing data generation program", "printing data generation method", and "program-recorded recording medium", descriptions in the "description of exemplary embodiments", and others.

Fourth Aspect

According to a printing device of a fourth aspect, in the first aspect, the banding avoiding dot formation pattern data is generated on a dithering level basis, and based on a tone value of the image data corresponding to the nozzle relating to the banding problem, the printing data generation unit replaces the image data with the dot formation pattern data for the dithering level.

With such a configuration, a tone value of image data is used as a basis to replace the image data with dot formation pattern data. This favorably eliminates the need to calculate the tone after the dithering conversion so that the process can be effectively simplified. There is also no more need for dithering level calculation for the replacement position before the replacement process so that the process can be increased in speed.

Fifth Aspect

According to a printing device of a fifth aspect, in any one of the first to fourth aspects, the printing data generation unit partially replaces, with the banding avoiding dot formation pattern data, the data in the image data about the dots taken charge by the nozzle relating to the banding problem or the image data.

Such a configuration enables to replace, not entirely but partially, dots taken charge by the nozzle relating to the banding problem or a dot formation pattern of an image with a banding avoiding dot formation pattern. This favorably reduces degradation of printing quality such as white and dark streaks as a result of the banding problem. This also effectively reduces degradation of image quality due to deterioration in granularity as a result of entire replacement, or due to rule disturbance in the N-value process when the printing data is generated.

Sixth Aspect

According to a sixth aspect, in any one of the first to fifth aspects, for a predetermined dithering level, the dot formation pattern data storage unit stores a group of the banding avoiding dot formation pattern data each including data about a dot formation pattern, and the printing data generation unit replaces the dot formation pattern data with two or more of the dot formation pattern data selected from the group of the dot formation pattern data.

Such a configuration enables to perform replacement with combination of two or more of the dot formation pattern. This effectively prevents degradation of image quality that is often caused by human-perceivable designs of repeated patterns.

The expression of "predetermined dithering level" denotes not simply a single dithering level but a specific range of dithering levels. Assuming that a range of dithering levels is from 0 to 255, and in each of the dithering levels, the tone is incremented. With this being the case, a dithering level of 124 is defined as covering a range of 124.5, inclusive to 125.5, exclusive. That is, the dithering level is of a typical number covering a specific range, and the expression of "data each including data about a dot formation pattern for a predetermined dithering level" denotes, for example, the state that the banding avoiding dot formation pattern data is plurally generated to represent a dithering level of 124, e.g., a dithering level covering a range of 124.5, inclusive to 125.5, exclusive. This is applicable to aspects of "printing device control program", "printing device control method", "printing data generation device", "printing data generation program", "printing data generation method", and "program-recorded recording medium", descriptions in the "description of exemplary embodiments", and others.

The expression of "through combination" denotes replacement performed in such a manner that dot formation patterns of a kind are not arranged in a row, e.g., two or more dot formation patterns are alternately arranged. This is because if dot formation patterns of a kind are arranged in a row, the resulting repeated patterns become human-perceivable so that the image quality is degraded. As a measure against such a problem, two or more dot formation patterns are used together for replacement of dot formation patterns of a specific-one dithering level. The two or more dot formation patterns are selected at random from a plurality of those provided in advance, or selected in order determined in advance. Note here that as long as the replacing part is not entirely replaced with dot formation patterns of a kind, a few of the same dot formation pattern may be arranged in a row. This is applicable to aspects of "printing device control program", "printing device control method", "printing data generation device", "printing data generation program", "printing data generation method", and "program-recorded recording medium", descriptions in the "description of exemplary embodiments", and others.

Seventh Aspect

According to a printing device of a seventh aspect, in any one of the first to fourth aspects, for a predetermined dithering level, the dot formation pattern data storage unit stores a group of the banding avoiding dot formation pattern data each including data about a dot formation pattern, and the printing data generation unit replaces a part of the data in the image data about the dots taken charge by the nozzle relating to the banding problem with the banding avoiding dot formation pattern data to derive a target dithering level for an entire of the dots taken charge by the nozzle relating to the banding problem by a combination of a dithering level of a dot formation pattern selected from the group of the dot formation pattern data for a part of the dots, and a dithering level of a dot formation pattern for any other of the dots in the vicinity of the dot formation pattern for the part of the dots.

Such a configuration enables to replace, not entirely but partially, a dot formation pattern of dots taken charge by a nozzle relating to a banding problem with banding avoiding dot formation pattern data. The configuration also enables replacement using two or more of a dot formation pattern. This favorably reduces degradation of image quality due to deterioration in granularity as a result of entire replacement, or due to rule disturbance in the N-value process when the printing data is generated. This also effectively prevents degradation of image quality that is often caused by human-perceivable designs of repeated patterns.

The expression of "any other of the dots in the vicinity of the dot formation pattern" denotes dots, out of those taken charge by a nozzle relating to a banding problem, located in the vicinity of dots in a replacing part, i.e., partial dots. For example, the expression denotes dots configuring a dot formation pattern of the same size as a dot formation pattern including the partial dots, and dots formed by the same nozzle as for the partial dots to be replaced. This is applicable to aspects of "printing device control program", "printing device control method", "printing data generation device", "printing data generation program", "printing data generation method", and "program-recorded recording medium", descriptions in the "description of exemplary embodiments", and others.

The expression of "target dithering level" denotes a dithering level that is originally expected to be represented by dots to be formed by a nozzle relating to a banding problem. The aspects of the invention are directed for brightness change through pattern replacement. More in detail, with a target dithering level being the brightness of "127", if a dot pattern of dots formed by a nozzle relating to a banding problem is showing the entire brightness of "126" due to ink deflection or others, the dot pattern is partially replaced with a pattern with the brightness of "128" so that the entire brightness is changed to "127". This is applicable to aspects of "printing device control program", "printing device control method", "printing data generation device", "printing data generation program", "printing data generation method", and "program-recorded recording medium", descriptions in the "description of exemplary embodiments", and others.

Eighth Aspect

According to a printing device of an eighth aspect, in the sixth or seventh aspect, the group of the dot formation pattern data is of the same pattern size but of different dot formation details.

Such a configuration enables replacement using two or more of a dot formation pattern of the same pattern size but of different dot formation details. This effectively prevents degradation of image quality that is often caused by human-perceivable designs of repeated patterns.

The expression of "dot formation patterns of different dot formation details" denotes, for representation of a specific dithering level, dot formation patterns sharing the same number of dots and area size for dot formation, but being different only in dot formation position. This is applicable to aspects of "printing device control program", "printing device control method", "printing data generation device", "printing data generation program", "printing data generation method", and "program-recorded recording medium", descriptions in the "description of exemplary embodiments", and others.

Ninth Aspect

According to a ninth aspect, in the sixth or seventh aspect, the group of the dot formation pattern data is of different pattern size.

Such a configuration enables replacement using two or more of a dot formation pattern of different pattern size. This effectively prevents degradation of image quality that is often caused by human-perceivable designs of repeated patterns.

Tenth Aspect

According to a printing device of a tenth aspect, in any one of the sixth to ninth aspects, the printing data generation unit searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in order of selection, disposes the selected banding avoiding dot formation pattern data as a replacement for the data in the image data about the dots taken charge by the nozzle relating to the banding problem.

Such a configuration enables to select at random two or more of banding avoiding dot formation pattern data from those each including data about a dot formation pattern, and in order of selection, dispose the selected data as a replacement for a dot formation pattern in image data for a nozzle relating to a banding problem. This favorably prevents the same pattern from being arranged in a row, and thus effectively prevents degradation of image quality that is often caused by human-perceivable designs of repeated patterns.

Eleventh Aspect

According to a printing device of an eleventh aspect, in any one of the sixth to ninth aspects, the printing data generation unit searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem. Here, "random selection" means "as the line of the dot formation pattern of the same kind becomes discontinuous".

Such a configuration enables to select at random two or more of banding avoiding dot formation pattern data from those each including data about a dot formation pattern, and in such a manner that the dot formation patterns of a kind are not arranged in a row, dispose the selected data as a replacement for dot formation pattern data in the N-valued image data for a nozzle relating to a banding problem. This favorably prevents the same pattern from being arranged in a row, and thus effectively prevents degradation of image quality that is often caused by human-perceivable designs of repeated patterns.

Twelfth Aspect

According to a printing device of a twelfth aspect, in any one of the first to eleventh aspects, the printing head is configured by the nozzles successively disposed over a region wider than a region with the printing medium being attached.

Such a configuration enables to generate, as described above, printing data that serves effectively to make white and dark streaks less noticeable. These streaks are those caused by a banding problem, which is often observed in line head printing heads that complete printing with a single scan, i.e., a single path.

Herein, the expression of "printing with a single scan" denotes a printing operation in which lines are printed by each corresponding nozzle in the paper feeding direction, i.e., direction along which a printing head moves, and when the nozzles pass through their lines, the printing operation is through for the lines. This is applicable to aspects of "printing device control program", "printing device control method", "printing data generation device", "printing data generation program", "printing data generation method", and "program-recorded recording medium", descriptions in the "description of exemplary embodiments", and others.

Thirteenth Aspect

According to a printing device of a thirteenth aspect, in any one of the first to eleventh aspects, the printing head takes charge of printing while reciprocating in a direction perpendicular to a paper feeding direction of the printing medium.

The above-described banding problem is pretty common with printing heads of line head type, but printing heads of multi-path type are not yet free from such a problem. In view thereof, such a configuration allows application of the printing device of any one of the first to eleventh aspects to the printing heads of multi-path type, thereby generating printing data serving effectively to make white and dark streaks less noticeable. These streaks are those caused by a banding problem, which is observed in multi-path printing heads.

With the printing heads of multi-path type, the above-described banding problem can be prevented by repeated image scanning using the printing head, for example. However, using the printing device of any one of the first to eleventh aspects favorably eliminates such a need to repeatedly perform image scanning using the printing head, and the higher-speed printing can be implemented.

Fourteenth Aspect

A fourteenth aspect of the invention is directed to a printing device control program for use of controlling a printing device that prints an image by forming a dot formation pattern on a printing medium in accordance with image data of a printing object using a printing head that includes a plurality of nozzles each being capable of forming dots to the printing medium. The printing device control program includes, for process execution by a computer: acquiring the image data showing pixel values of M (M≧2) for the image; generating printing data as a result of converting the image data into dot formation pattern data for use of forming a printing image of the image data on the printing medium; and printing, based on the printing data, the printing image of the image data onto the printing medium using the printing head. In the printing device control program, based on the image data, and dot formation pattern data for forming a dot formation pattern for banding avoidance use that includes the dots each being correlated to information about any of the nozzles relating to a banding problem, the generating generates the printing data by replacing data in the image data about the dots taken charge by the nozzle relating to the banding problem with the banding avoiding dot formation pattern data for the nozzle.

Such a configuration leads to effects and advantages similar to the printing device of the first aspect by a computer reading a program and executing processes in accordance with the program.

Printing devices on the current market such as ink jet printers are each provided with a computer system, which is configured to include a Central Processing Unit (CPU), a storage device (Random Access Memory (RAM), Read Only Memory (ROM)), an input/output device, or others. Using such a computer system, the processes can be implemented by software. The printing device control program thus can implement the processes more economically and with more ease than a case with hardware that is specifically built for the purpose.

Moreover, through partial rewriting of the program, it leads to easy version up by function modification or improvement, for example.

Fifteenth Aspect

According to a printing device control program of a fifteenth aspect, in the fourteenth aspect, the banding avoiding dot formation pattern data is generated on a dithering level basis, and based on a dithering level of the dot formation pattern for the image data including the dots taken charge by the nozzle relating to the banding problem, the generating replaces data about the dot formation pattern with the dot formation pattern data for the dithering level.

Such a configuration leads to effects and advantages similar to the printing device of the second aspect by a computer reading a program and executing processes in accordance with the program.

Sixteenth Aspect

According to a printing device control program of a sixteenth aspect, in the fourteenth or fifteenth aspect, when there is no banding avoiding dot formation pattern data corresponding to the dithering level of the dot formation pattern for the image data including the dots taken charge by the nozzle relating to the banding problem, the generating replaces the data about the dot formation pattern for the nozzle relating to the banding problem with two or more of the banding avoiding dot formation pattern data whose dithering levels are different.

Such a configuration leads to effects and advantages similar to the printing device of the third aspect by a computer reading a program and executing processes in accordance with the program.

Seventeenth Aspect

According to a printing device control program of a seventeenth aspect, in the fourteenth aspect, the banding avoiding dot formation pattern data is generated on a dithering level basis, and based on a tone value of the image data corresponding to the nozzle relating to the banding problem, the generating replaces the image data with the dot formation pattern data for the dithering level.

Such a configuration leads to effects and advantages similar to the printing device of the fourth aspect by a computer reading a program and executing processes in accordance with the program.

Eighteenth Aspect

According to a printing device control program of an eighteenth aspect, in any one of the fourteenth to seventeenth aspects, the generating partially replaces, with the banding avoiding dot formation pattern data, the data in the image data about the dots taken charge by the nozzle relating to the banding problem or the image data.

Such a configuration leads to effects and advantages similar to the printing device of the fifth aspect by a computer reading a program and executing processes in accordance with the program.

Nineteenth Aspect

According to a printing device control program of a nineteenth aspect, in any one of the fourteenth to eighteenth aspects, the generating replaces the dot formation pattern data with two or more of the dot formation pattern data selected from a group of the banding avoiding dot formation pattern data each including data about a dot formation pattern for a predetermined dithering level.

Such a configuration leads to effects and advantages similar to the printing device of the sixth aspect by a computer reading a program and executing processes in accordance with the program.

Twentieth Aspect

According to a printing device control program of a twentieth aspect, in any one of the fourteenth to nineteenth aspects, the generating replaces a part of the data in the image data about the dots taken charge by the nozzle relating to the banding problem with the banding avoiding dot formation pattern data to derive a target dithering level for an entire of the dots taken charge by the nozzle relating to the banding problem by a combination of a dithering level of a dot formation pattern selected, for a part of the dots, from a group of the banding avoiding dot formation pattern data each including data about a dot formation pattern for a predetermined dithering level, and a dithering level of a dot formation pattern for any other of the dots in the vicinity of the dot formation pattern for the part of the dots.

Such a configuration leads to effects and advantages similar to the printing device of the seventh aspect by a computer reading a program and executing processes in accordance with the program.

Twenty-First Aspect

According to a printing device control program of a twenty-first aspect, in the nineteenth or twentieth aspect, the group of the dot formation pattern data is of the same pattern size but of different dot formation details.

Such a configuration leads to effects and advantages similar to the printing device of the eighth aspect by a computer reading a program and executing processes in accordance with the program.

Twenty-Second Aspect

According to a printing device control program of a twenty-second aspect, in the nineteenth or twenty aspect, the group of the dot formation pattern data is of different pattern size.

Such a configuration leads to effects and advantages similar to the printing device of the ninth aspect by a computer reading a program and executing processes in accordance with the program.

Twenty-Third Aspect

According to a printing device control program of a twenty-third aspect, in any one of the nineteenth to twenty-second aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in order of selection, disposes the selected banding avoiding dot formation pattern data as a replacement for the data in the image data about the dots taken charge by the nozzle relating to the banding problem.

Such a configuration leads to effects and advantages similar to the printing device of the tenth aspect by a computer reading a program and executing processes in accordance with the program.

Twenty-Fourth Aspect

According to a printing device control program of a twenty-fourth aspect, in any one of the nineteenth to twenty-second aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem.

Such a configuration leads to effects and advantages similar to the printing device of the eleventh aspect by a computer reading a program and executing processes in accordance with the program.

Twenty-Fifth Aspect

A twenty-fifth aspect of the invention is directed to a computer-readable printing-device-control-program-recorded recording medium that is recorded with the printing device control program of any one of the fourteenth to twenty-fourth aspects.

This leads to effects and advantages similar to the printing device control program of any one of the fourteenth to twenty-fourth aspects, and enables easy provision of the printing program via recording media such as CD-ROMs, DVD-ROMs, and MOs.

Twenty-Sixth Aspect

A twenty-sixth aspect of the invention is directed to a printing device control method for use of controlling a printing device that prints an image by forming a dot formation pattern on a printing medium in accordance with image data of a printing object using a printing head that includes a plurality of nozzles each being capable of forming dots to the printing medium. The printing device control method includes: acquiring the image data showing pixel values of M ($M \geq 2$) for the image; generating printing data as a result of converting the image data into dot formation pattern data for use of forming a printing image of the image data on the printing medium; and printing, based on the printing data, the printing image of the image data onto the printing medium using the printing head. In the printing device control method, based on the image data, and dot formation pattern data for forming a dot formation pattern for banding avoidance use that includes the dots each being correlated to information about any of the nozzles relating to a banding problem, the generating generates the printing data by replacing data in the image data about the dots taken charge by the nozzle relating to the banding problem with the banding avoiding dot formation pattern data for the nozzle.

To be more specific, the image data is acquired by a CPU executing a program stored in a recording medium such as ROM and loaded into RAM, e.g., through cooperation of an input unit such as scanner, a storage device such as HDD, an input/output interface, or others. The printing data is generated by a CPU executing a program stored in a recording medium such as ROM and loaded into RAM. Thereafter, a process using a various data stored in a storage device, e.g., dot formation pattern data, implements the processing. The printing is executed by a CPU executing a program stored in a recording medium such as ROM and loaded into RAM. This accordingly inputs a control signal to an output device configured by a drive mechanism such as a printing head, a paper feeding mechanism, or others so that the output device, i.e., printing unit, and the processing is implemented.

This leads to effects and advantages similar to the printing device of the first aspect.

Twenty-Seventh Aspect

According to a printing device control method of a twenty-seventh aspect, in the twenty-sixth aspect, the banding avoiding dot formation pattern data is generated on a dithering level basis, and based on a dithering level of the dot formation pattern for the image data including the dots taken charge by the nozzle relating to the banding problem, the generating replaces data about the dot formation pattern with the dot formation pattern data for the dithering level.

This leads to effects and advantages similar to the printing device of the second aspect.

Twenty-Eighth Aspect

According to a printing device control method of a twenty-eighth aspect, in the twenty-sixth or twenty-seventh aspect, when there is no banding avoiding dot formation pattern data corresponding to the dithering level of the dot formation pattern for the image data including the dots taken charge by the nozzle relating to the banding problem, the generating replaces the data about the dot formation pattern for the nozzle relating to the banding problem with two or more of the banding avoiding dot formation pattern data whose dithering levels are different.

This leads to effects and advantages similar to the printing device of the third aspect.

Twenty-Ninth Aspect

According to a printing device control method of a twenty-ninth aspect, in the twenty-sixth aspect, the banding avoiding dot formation pattern data is generated on a dithering level basis, and based on a tone value of the image data corresponding to the nozzle relating to the banding problem, the generating replaces the image data with the dot formation pattern data for the dithering level.

This leads to effects and advantages similar to the printing device of the fourth aspect.

Thirtieth Aspect

According to a printing device control method of a thirtieth aspect, in any one of the twenty-sixth to twenty-ninth aspects, the generating partially replaces, with the banding avoiding dot formation pattern data, the data in the image data about the dots taken charge by the nozzle relating to the banding problem or the image data.

This leads to effects and advantages similar to the printing device of the fifth aspect.

Thirty-First Aspect

According to a printing device control method of a thirty-first aspect, in any one of the twenty-sixth to thirtieth aspects, the generating replaces the dot formation pattern data with two or more of the dot formation pattern data selected from a group of the banding avoiding dot formation pattern data each including data about a dot formation pattern for a predetermined dithering level.

This leads to effects and advantages similar to the printing device of the sixth aspect.

Thirty-second Aspect

According to a printing device control method of a thirty-second aspect, in any one of the twenty-sixth to twenty-ninth aspects, the generating replaces a part of the data in the image data about the dots taken charge by the nozzle relating to the banding problem with the banding avoiding dot formation pattern data to derive a target dithering level for an entire of the dots taken charge by the nozzle relating to the banding problem by a combination of a dithering level of a dot formation pattern selected, for a part of the dots, from a group of the banding avoiding dot formation pattern data each including data about a dot formation pattern for a predetermined dithering level, and a dithering level of a dot formation pattern for any other of the dots in the vicinity of the dot formation pattern for the part of the dots.

This leads to effects and advantages similar to the printing device of the seventh aspect.

Thirty-Third Aspect

According to a printing device control method of a thirty-third aspect, in thirty-first or thirty-second aspect, the group of the dot formation pattern data is of the same pattern size but of different dot formation details.

This leads to effects and advantages similar to the printing device of the eighth aspect.

Thirty-fourth Aspect

According to a printing device control method of a thirty-fourth aspect, in the thirty-first or thirty-second aspect, the group of the dot formation pattern data is of different pattern size.

This leads to effects and advantages similar to the printing device of the ninth aspect.

Thirty-Fifth Aspect

According to a printing device control method of a thirty-fifth aspect, in any one of the thirty-first to thirty-fourth aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in order of selection, disposes the selected banding avoiding dot formation pattern data as a replacement for the data in the image data about the dots taken charge by the nozzle relating to the banding problem.

This leads to effects and advantages similar to the printing device of the tenth aspect.

Thirty-Sixth Aspect

According to a printing device control method of a thirty-sixth aspect, in any one of the thirty-first to thirty-fourth aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem.

This leads to effects and advantages similar to the printing device of the eleventh aspect.

Thirty-Seventh Aspect

A thirty-seventh aspect of the invention is directed to a printing data generation device that generates printing data for use in a printing device that prints an image by forming a dot formation pattern on a printing medium in accordance with image data of a printing object using a printing head that includes a plurality of nozzles each being capable of forming dots to the printing medium. The printing data generation device includes: an image data acquisition unit that acquires the image data showing pixel values of M ($M \geq 2$) for the image; a dot formation pattern data storage unit that stores banding avoiding dot formation pattern data for forming a dot formation pattern for banding avoidance use that includes the dots each being correlated to information about any of the nozzles relating to a banding problem; and a printing data generation unit that generates printing data as a result of converting the image data into dot formation pattern data for use of forming a printing image of the image data on the printing medium. In the printing data generation device, based on the image data, and the dot formation pattern data stored in the dot formation pattern data storage unit, the printing data generation unit generates the printing data by replacing data in the image data about the dots taken charge by the nozzle relating to the banding problem with the banding avoiding dot formation pattern data for the nozzle.

That is, the thirty-seventh aspect includes no such printing unit for actual printing as the above-described printing devices, but generates printing data corresponding to the properties of a printing head based on original M-value image data.

Accordingly, such a configuration can lead to effects and advantages similar to the printing device of the first aspect. For example, only by forwarding the generated printing data to a printing device, the printing device becomes able to execute a printing process. Accordingly, such a configuration eliminates the need to provide any specific printing device, and any existing ink jet printing device can be used as it is.

Furthermore, it allows the use of general-purpose information processors such as personal computers, and thus any existing printing system can be used as it is, being configured by a printing command device such as a personal computer, and an ink jet printer.

Thirty-Eighth Aspect

According to a printing data generation device of a thirty-eighth aspect, in the thirty-seventh aspect, the banding avoiding dot formation pattern data is generated on a dithering level basis, and based on a dithering level of the dot formation pattern for the image data including the dots taken charge by the nozzle relating to the banding problem, the printing data generation unit replaces data about the dot formation pattern with the dot formation pattern data for the dithering level.

This leads to effects and advantages similar to the printing device of the second aspect.

Thirty-Ninth Aspect

According to a printing data generation device of a thirty-ninth aspect, in the thirty-seventh or thirty-eighth aspect, when the dot formation pattern data storage unit is not storing the banding avoiding dot formation pattern data corresponding to the dithering level of the dot formation pattern for the image data including the dots taken charge by the nozzle relating to the banding problem, the printing data generation unit replaces the data about the dot formation pattern for the nozzle relating to the banding problem with two or more of the banding avoiding dot formation pattern data whose dithering levels are different.

This leads to effects and advantages similar to the printing device of the third aspect.

Fortieth Aspect

According to a printing data generation device of a fortieth aspect, in the thirty-seventh aspect, the banding avoiding dot formation pattern data is generated on a dithering level basis, and based on a tone value of the image data corresponding to the nozzle relating to the banding problem, the printing data generation unit replaces the image data with the dot formation pattern data for the dithering level.

This leads to effects and advantages similar to the printing device of the fourth aspect.

Forty-First Aspect

According to a printing data generation device of a forty-first aspect, in any one of the thirty-seventh to fortieth aspects, the printing data generation unit partially replaces, with the banding avoiding dot formation pattern data, the data in the image data about the dots taken charge by the nozzle relating to the banding problem or the image data.

This leads to effects and advantages similar to the printing device of the fifth aspect.

Forty-Second Aspect

According to a printing data generation device of a forty-second aspect, in any one of the thirty-seventh to forty-first aspects, for a predetermined dithering level, the dot formation pattern data storage unit stores a group of the banding avoiding dot formation pattern data each including data about a dot formation pattern, and the printing data generation unit replaces the dot formation pattern data with two or more of the dot formation pattern data selected from the group of the dot formation pattern data.

This leads to effects and advantages similar to the printing device of the sixth aspect.

Forty-Third Aspect

According to a printing data generation device of a forty-third aspect, in any one of the thirty-seventh to fortieth aspects, for a predetermined dithering level, the dot formation pattern data storage unit stores a group of the banding avoiding dot formation pattern data each including data about a dot formation pattern, and the printing data generation unit replaces a part of the data in the image data about the dots taken charge by the nozzle relating to the banding problem with the banding avoiding dot formation pattern data to derive a target dithering level for an entire of the dots taken charge by the nozzle relating to the banding problem by a combination of a dithering level of a dot formation pattern selected from the group of the dot formation pattern data for a part of the dots, and a dithering level of a dot formation pattern for any other of the dots in the vicinity of the dot formation pattern for the part of the dots.

This leads to effects and advantages similar to the printing device of the seventh aspect.

Forty-Fourth Aspect

According to a printing data generation device of a forty-fourth aspect, in the forty-second or forty-third aspect, the group of the dot formation pattern data is of the same pattern size but of different dot formation details.

This leads to effects and advantages similar to the printing device of the eighth aspect.

Forty-Fifth Aspect

According to a printing data generation device of a forty-fifth aspect, in the forty-second or forty-third aspect, the group of the dot formation pattern data is of different pattern size.

This leads to effects and advantages similar to the printing device of the ninth aspect.

Forty-Sixth Aspect

According to a printing data generation device of a forty-sixth aspect, in any one of the forty-second to forty-fifth aspects, the printing data generation unit searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in order of selection, disposes the selected banding avoiding dot formation pattern data as a replacement for the data in the image data about the dots taken charge by the nozzle relating to the banding problem.

This leads to effects and advantages similar to the printing device of the tenth aspect.

Forty-Seventh Aspect

According to a printing data generation device of a forty-seventh aspect, in any one of the forty-second to forty-fifth aspects, the printing data generation unit searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem.

This leads to effects and advantages similar to the printing device of the eleventh aspect.

Forty-Eighth Aspect

A forty-eighth aspect of the invention is directed to a printing data generation program that generates printing data for use in a printing device that prints an image by forming a dot formation pattern on a printing medium in accordance with image data of a printing object using a printing head that includes a plurality of nozzles each being capable of forming dots to the printing medium. The printing data generation program includes, for process execution by a computer: acquiring the image data showing pixel values of M ($M \geq 2$) for the image; and generating printing data as a result of converting the image data into dot formation pattern data for use of forming a printing image of the image data on the printing medium. In the printing data generation program, based on the image data, and dot formation pattern data for forming a dot formation pattern for banding avoidance use that includes the dots each being correlated to information about any of the nozzles relating to a banding problem, the generating generates the printing data by replacing data in the image data about the dots taken charge by the nozzle relating to the banding problem with the banding avoiding dot formation pattern data for the nozzle.

Such a configuration leads to effects and advantages similar to the printing data generation device of the thirty-seventh aspect by a computer reading a program and executing processes in accordance with the program.

Forty-Ninth Aspect

According to a printing data generation program of a forty-ninth aspect, in the forty-eighth aspect, the banding avoiding dot formation pattern data is generated on a dithering level basis, and based on a dithering level of the dot formation pattern for the image data including the dots taken charge by the nozzle relating to the banding problem, the generating replaces data about the dot formation pattern with the dot formation pattern data for the dithering level.

Such a configuration leads to effects and advantages similar to the printing data generation device of the thirty-eighth aspect by a computer reading a program and executing processes in accordance with the program.

Fiftieth Aspect

According to a printing data generation program of a fiftieth aspect, in the forty-eighth or forty-ninth aspect, when there is no banding avoiding dot formation pattern data corresponding to the dithering level of the dot formation pattern for the image data including the dots taken charge by the nozzle relating to the banding problem, the generating replaces the data about the dot formation pattern for the nozzle relating to the banding problem with two or more of the banding avoiding dot formation pattern data whose dithering levels are different.

Such a configuration leads to effects and advantages similar to the printing data generation device of the thirty-ninth aspect by a computer reading a program and executing processes in accordance with the program.

Fifty-first Aspect

According to a printing data generation program of a fifty-first aspect, in the forty-eighth aspect, the banding avoiding dot formation pattern data is generated on a dithering level basis, and based on a tone value of the image data corresponding to the nozzle relating to the banding problem, the generating replaces the image data with the dot formation pattern data for the dithering level.

Such a configuration leads to effects and advantages similar to the printing data generation device of the fortieth aspect by a computer reading a program and executing processes in accordance with the program.

Fifty-Second Aspect

According to a printing data generation program of a fifty-second aspect, in any one of the forty-eighth to fifty-first aspects, the generating partially replaces, with the banding avoiding dot formation pattern data, the data in the image data about the dots taken charge by the nozzle relating to the banding problem or the image data.

Such a configuration leads to effects and advantages similar to the printing data generation device of the forty-first aspect by a computer reading a program and executing processes in accordance with the program.

Fifty-Third Aspect

According to a printing data generation program of a fifty-third aspect, in any one of the forty-eighth to fifty-second aspects, the generating replaces the dot formation pattern data with two or more of the dot formation pattern data selected from a group of the banding avoiding dot formation pattern data each including data about a dot formation pattern for a predetermined dithering level.

Such a configuration leads to effects and advantages similar to the printing data generation device of the forty-second aspect by a computer reading a program and executing processes in accordance with the program.

Fifty-Fourth Aspect

According to a printing data generation program of a fifty-fourth aspect, in any one of the forty-eighth to fifty-first aspects, the generating replaces a part of the data in the image data about the dots taken charge by the nozzle relating to the banding problem with the banding avoiding dot formation pattern data to derive a target dithering level for an entire of the dots taken charge by the nozzle relating to the banding problem by a combination of a dithering level of a dot formation pattern selected, for a part of the dots, from a group of the banding avoiding dot formation pattern data each including data about a dot formation pattern for a predetermined dithering level, and a dithering level of a dot formation pattern for any other of the dots in the vicinity of the dot formation pattern for the part of the dots.

Such a configuration leads to effects and advantages similar to the printing data generation device of the forty-third aspect by a computer reading a program and executing processes in accordance with the program.

Fifty-Fifth Aspect

According to a printing data generation program of a fifty-fifth aspect, in the fifty-third or fifty-fourth aspect, the group of the dot formation pattern data is of the same pattern size but of different dot formation details.

Such a configuration leads to effects and advantages similar to the printing data generation device of the forty-fourth aspect by a computer reading a program and executing processes in accordance with the program.

Fifty-Sixth Aspect

According to a printing data generation program of a fifty-sixth aspect, in the fifty-third or fifty-fourth aspect, the group of the dot formation pattern data is of different pattern size.

Such a configuration leads to effects and advantages similar to the printing data generation device of the forty-fifth aspect by a computer reading a program and executing processes in accordance with the program.

Fifty-Seventh Aspect

According to a printing data generation program of a fifty-seventh aspect, in any one of the fifty-third to fifty-sixth aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern-data, and in order of selection, disposes the selected banding avoiding dot formation pattern data as a replacement for the data in the image data about the dots taken charge by the nozzle relating to the banding problem.

Such a configuration leads to effects and advantages similar to the printing data generation device of the forty-sixth aspect by a computer reading a program and executing processes in accordance with the program.

Fifty-Eighth Aspect

According to a printing data generation program of a fifty-eighth aspect, in any one of the fifty-third to fifty-sixth aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem.

Such a configuration leads to effects and advantages similar to the printing data generation device of the forty-seventh aspect by a computer reading a program and executing processes in accordance with the program.

Fifty-Ninth Aspect

A fifty-ninth aspect of the invention is directed to a computer-readable printing-data-generation-program recorded recording medium that is recorded with the printing data generation program of any one of the forty-eighth to fifty-eighth aspects.

This leads to effects and advantages similar to the printing data generation program of any one of the forty-eighth to fifty-eighth aspects, and enables easy provision of the printing program via recording media such as CD-ROMs, DVD-ROMs, and FDs (Flexible Disks).

Sixtieth Aspect

A sixtieth aspect of the invention is directed to a printing data generation method that generates printing data for use in a printing device that prints an image by forming a dot formation pattern on a printing medium in accordance with image data of a printing object using a printing head that includes a plurality of nozzles each being capable of forming dots to the printing medium. The printing device generation method includes: acquiring the image data showing pixel values of M (M≧2) for the image; and generating printing data as a result of converting the image data into dot formation pattern data for use of forming a printing image of the image data on the printing medium. In the printing data generation method, based on the image data, and dot formation pattern data for forming a dot formation pattern for banding avoidance use that includes the dots each being correlated to information about any of the nozzles relating to a banding problem, the generating generates the printing data by replacing data in the image data about the dots taken charge by the nozzle relating to the banding problem with the banding avoiding dot formation pattern data for the nozzle.

To be more specific, the image data is acquired by a CPU executing a program stored in a recording medium and loaded into RAM, e.g., through cooperation of an input unit such as scanner, a storage device such as HDD, an input/output interface, or others. The recording medium here is exemplified by ROM or others provided to an information processor such as personal computer that generates printing data. The printing data is generated by a CPU executing a program stored in a recording medium and loaded into RAM. The recording medium here is also exemplified by ROM or others provided to an information processor such as personal computer that generates printing data. Thereafter, a process using a various data stored in a storage device, e.g., dot formation pattern data, implements the processing.

Such a configuration leads to effects and advantages similar to the printing data generation device of the thirty-seventh aspect.

Sixty-First Aspect

According to a printing data generation method of a sixty-first aspect, in the sixtieth aspect, the banding avoiding dot formation pattern data is generated on a dithering level basis, and based on a dithering level of the dot formation pattern for the image data including the dots taken charge by the nozzle relating to the banding problem, the generating replaces data about the dot formation pattern with the dot formation pattern data for the dithering level.

This leads to effects and advantages similar to the printing data generation device of the thirty-eighth aspect.

Sixty-Second Aspect

According to a printing data generation method of a sixty-second aspect, in the sixtieth or sixty-first aspect, when there is no banding avoiding dot formation pattern data corresponding to the dithering level of the dot formation pattern for the image data including the dots taken charge by the nozzle relating to the banding problem, the generating replaces the data about the dot formation pattern for the nozzle relating to the banding problem with two or more of the banding avoiding dot formation pattern data whose dithering levels are different.

This leads to effects and advantages similar to the printing data generation device of the thirty-ninth aspect.

Sixty-Third Aspect

According to a printing data generation method of a sixty-third aspect, in the sixtieth aspect, the banding avoiding dot formation pattern data is generated on a dithering level basis, and based on a tone value of the image data corresponding to the nozzle relating to the banding problem, the generating replaces the image data with the dot formation pattern data for the dithering level.

This leads to effects and advantages similar to the printing data generation device of the fortieth aspect.

Sixty-Fourth Aspect

According to a printing data generation method of a sixty-fourth aspect, in any one of the sixtieth to sixty-third aspects, the generating partially replaces, with the banding avoiding dot formation pattern data, the data in the image data about the dots taken charge by the nozzle relating to the banding problem or the image data.

This leads to effects and advantages similar to the printing data generation device of the forty-first aspect.

Sixty-Fifth Aspect

According to a printing data generation method of a sixty-fifth aspect, in any one of the sixtieth to sixty-fourth aspects, the generating replaces the dot formation pattern data with two or more of the dot formation pattern data selected from a group of the banding avoiding dot formation pattern data each including data about a dot formation pattern for a predetermined dithering level.

This leads to effects and advantages similar to the printing data generation device of the forty-second aspect.

Sixty-Sixth Aspect

According to a printing data generation method of a sixty-sixth aspect, in any one of the sixtieth to sixty-third aspects, the generating replaces a part of the data in the image data about the dots taken charge by the nozzle relating to the banding problem with the banding avoiding dot formation pattern data to derive a target dithering level for an entire of the dots taken charge by the nozzle relating to the banding problem by a combination of a dithering level of a dot formation pattern selected, for a part of the dots, from a group of the banding avoiding dot formation pattern data each including data about a dot formation pattern for a predetermined dithering level, and a dithering level of a dot formation pattern for any other of the dots in the vicinity of the dot formation pattern for the part of the dots.

This leads to effects and advantages similar to the printing data generation device of the forty-third aspect.

Sixty-Seventh Aspect

According to a printing data generation method of a sixty-seventh aspect, in the sixty-fifth or sixty-sixth aspect, the group of the dot formation pattern data is of the same pattern size but of different dot formation details.

This leads to effects and advantages similar to the printing data generation device of the forty-fourth aspect.

Sixty-Eighth Aspect

According to a printing data generation method of a sixty-eighth aspect, in the sixty-fifth or sixty-sixth aspect, the group of the dot formation pattern data is of different pattern size.

This leads to effects and advantages similar to the printing data generation device of the forty-fifth aspect.

Sixty-Ninth Aspect

According to a printing data generation method of a sixty-ninth aspect, in any one of the sixty-fifth to sixty-eighth aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in order of selection, disposes the selected banding avoiding dot formation pattern data as a replacement for the data in the image data about the dots taken charge by the nozzle relating to the banding problem.

This leads to effects and advantages similar to the printing data generation device of the forty-sixth aspect.

Seventieth Aspect

According to a printing data generation method of a seventieth aspect, in any one of the sixty-fifth to sixty-eighth aspects, the generating searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem.

This leads to effects and advantages similar to the printing data generation device of the forty-seventh aspect.

BRIEF DESCRIPTION OF THE DRAWINGS

The invention will be described with reference to the accompanying drawings, wherein like numbers reference like elements.

FIG. 9A shows a banding avoiding dot formation pattern for a dithering level with a density value of "63".

FIG. 9B shows a banding avoiding dot formation pattern for a dithering level with a density value of "95".

FIG. 10A is a diagram showing an exemplary replacement pattern in a continuous replacement mode.

FIG. 10B is a diagram showing an exemplary replacement pattern in a decimation replacement mode.

DESCRIPTION OF EXEMPLARY EMBODIMENTS

First Embodiment

Described below is a first embodiment of the invention referring to the accompanying drawings. FIGS. 1 to 11B are all a diagram showing the first embodiment of the invention, i.e., a printing device, a printing device control program and method, and a printing data generation device, program, and method.

Figure 1:
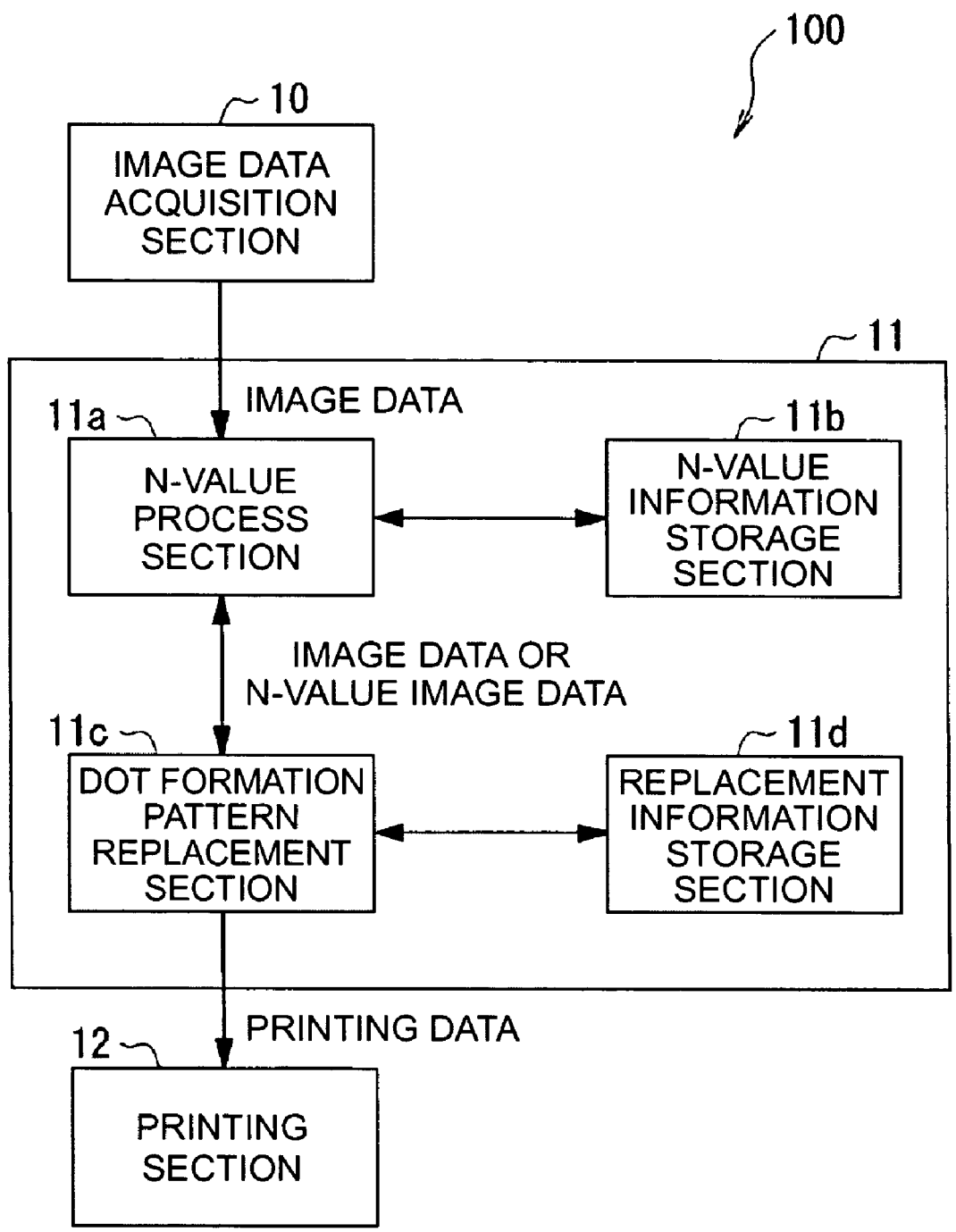
FIG. 1 is a block diagram showing the configuration of a printing device 100 of the invention.

Described first is the configuration of a printing device 100 of the invention by referring to FIG. 1. FIG. 1 is a block diagram showing the configuration of the printing device 100 of the invention.

As shown in FIG. 1, the printing device 100 is of a line-head type, configured to include: an image data acquisition section 10; a printing data generation section 11; and a printing section 12. More specifically, the image data acquisition section 10 acquires image data from any external devices, storage devices, or others. The image data is the one configuring any predetermined image. The printing data generation section 11 generates printing data for use of printing images of image data onto a printing medium (printing paper in this example). The image data is the one derived by replacing dot formation pattern data about dots taken charge by a nozzle relating to a banding problem with banding avoiding dot formation pattern data. Based on the printing data, the printing section 12 prints the images of the image data onto the printing medium with ink jet technology.

The image data acquisition section 10 serves to acquire M-value ($M \geq 3$) image data in which tone (brightness value) is represented by 8 bits (0 to 255) on a pixel basis for the respective colors of R, G, and B. The image data acquisition section 10 is capable of acquiring such image data in response to any printing command coming from external devices, input devices of its own printing device 100, or others. Such image data acquisition is made from any external devices over a network such as LAN or WAN, from recording media such as CD-ROMs or DVD-ROMs via drives of its own printing device 100, e.g., CD drives or DVD drives, that are not shown, or from a storage device 70 of its own printing device 100 that will be described later. The image data acquisition section 10 also has a function of converting multi-value RGB data into multi-value CMYK (four colors) data corresponding to inks of the printing head 200 through color conversion.

The printing data generation section 11 is configured to include: an N-value process section 11a; an N-value information storage section 11b; a dot formation pattern replacement section 11c; and a replacement information storage section 11d. More specifically, the N-value process section 11a subjects, to an N-value process ($M>N \geq 2$), M-value image data through with CMYK conversion based on N-value information stored in the N-value information storage section 11b. The N-value information stored in the N-value information storage section 11b is needed for the N-value process, including threshold values set for every dot size type. The dot formation pattern replacement section 11c replaces the N-valued data about dots corresponding to a nozzle relating to a banding problem with banding avoiding dot formation pattern data based on replacement information stored in the replacement information storage section 11d. The replacement information stored in the replacement information storage section 11d is needed for a replacement process for the banding avoiding dot formation pattern data or others, corresponding to a nozzle number assigned to the nozzle relating to the banding problem. The replacement information storage section 11d serves to convert the CMYK-converted M-value image data into data for printing use in the ink-jet-type printing section 12, which will be described later, i.e., data about whether dots of a predetermined color and size are to be formed for every pixel data of the image data. Such data conversion is hereinafter referred to as "binarization" or "half toning" as appropriate.

Figure 3:
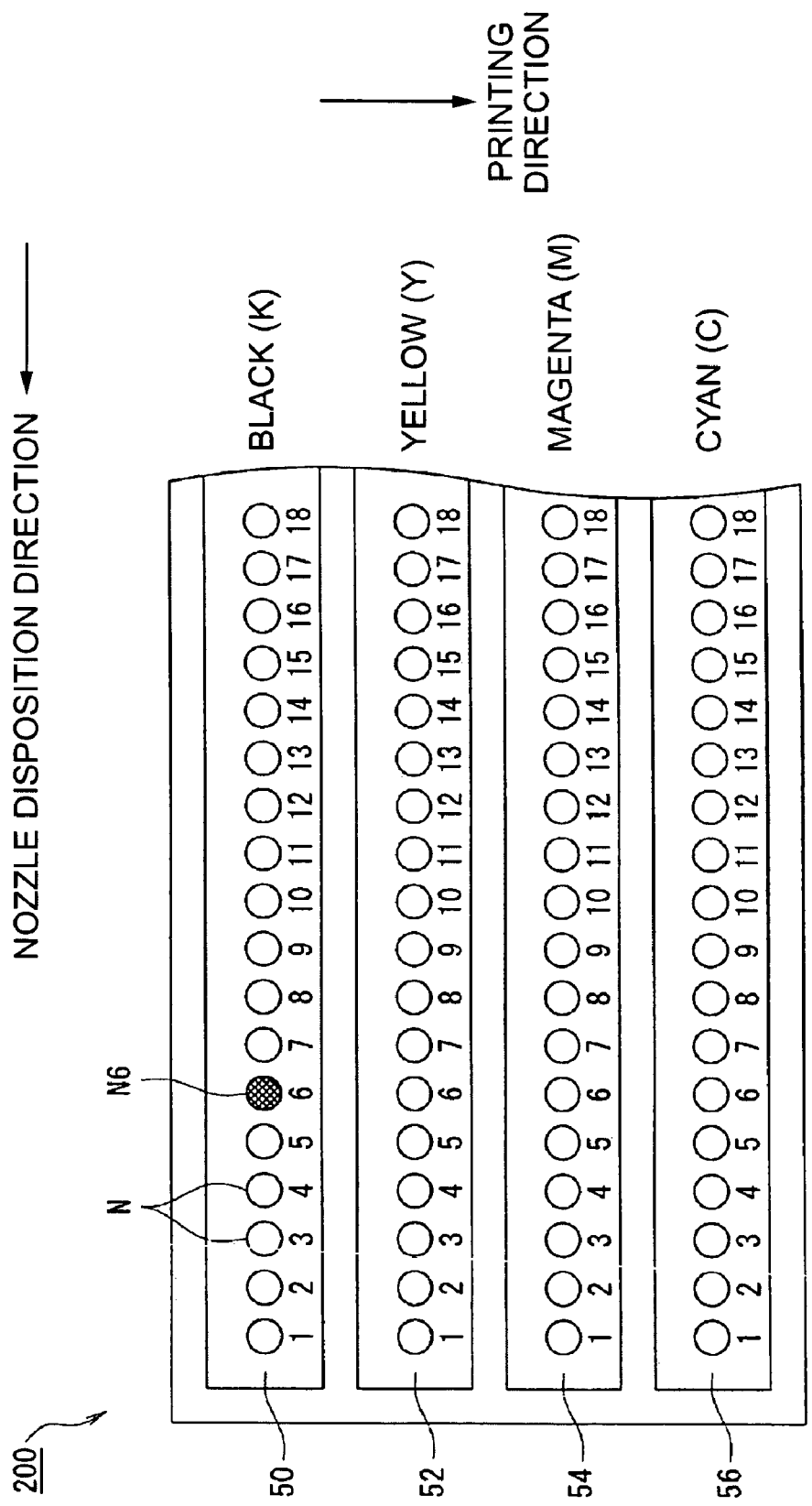
FIG. 3 is a partially-enlarged bottom view of a printing head 200 of the invention.
Figure 4:
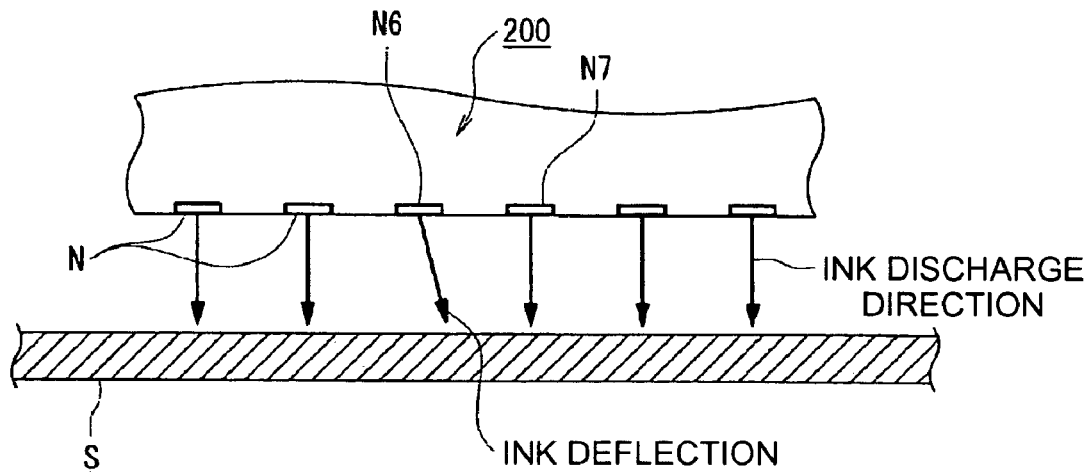
FIG. 4 is a partially-enlarged side view of the printing head 200 of FIG. 3.

FIG. 3 is a partially-enlarged bottom view of the printing head 200 of the invention provided to the printing section 12, and FIG. 4 is a partially-enlarged side view thereof.

As shown in FIG. 3, the printing head 200 is configured to include four nozzle modules of: a black nozzle module 50; a yellow nozzle module 52; a magenta nozzle module 54; and a cyan nozzle module 56. More specifically, the black nozzle module 50 carries a plurality of nozzles N (18 in the drawing) in a line in the direction along which the nozzles are disposed in the printing head 200, each of which discharges only black (K) ink. The yellow nozzle module 52 carries a plurality of nozzles N in a line in the nozzle disposition direction, each of which discharges only yellow (Y) ink. The magenta nozzle module 54 carries a plurality of nozzles N in a line in the nozzle disposition direction, each of which discharges only magenta (M) ink. The cyan nozzle module 56 carries a plurality of nozzles N in a line in the nozzle disposition direction, each of which discharges only cyan (C) ink. As shown in FIG. 3, the nozzle modules 50, 52, 54, and 56 are disposed as a unit in such a configuration that the nozzles N sharing the same number among these four nozzle modules come on the same line in the printing direction, i.e., direction perpendicular to the nozzle disposition direction. Accordingly, the nozzles N configuring the respective nozzle modules are disposed in a line along the nozzle disposition direction of the printing head 200. The nozzles N sharing the same number among these four nozzle modules are disposed in a line in the printing direction.

The printing head 200 configured as such prints circular dots on a white printing paper through ink discharge from nozzles N1, N2, N3, and others using piezoelectric elements exemplified by piezo actuators, which are not shown but provided to ink chambers. Here, the ink chambers, which are not shown, are respectively provided to the nozzles N1, N2, N3, and others, and carry therein ink. The printing head 200 can also print dots varying in size for each of the nozzles N1, N2, N3, and others by control exercise over the discharge amount of ink coming from the ink chambers through voltage change for application step by step to the piezo actuator. Alternatively, voltage application may be made to the nozzles in two steps in a short time in time series, and two ink droplets may be merged together on the printing paper to form a single dot. With this being the case, utilizing the fact that the ink discharge speed varies depending on the dot size, a single very-large dot can be formed by ink discharge on the printing paper at substantially the same position, i.e., a small dot first and then an enlarged dot.

As to these four nozzle modules 50, 52, 54, and 56, FIG. 4 shows an exemplary case where the nozzle N6 in the black nozzle module 50 located 6th from the left is causing ink deflection, and the nozzle N6 discharges ink onto a printing medium S in the diagonal direction. In such a case, dots formed by the faulty nozzle N6 on the printing medium S are formed in the vicinity of dots formed by a normal nozzle N7 on the printing medium S. The nozzle N7 is the one located next to the nozzle N6.

Referring back to FIGS. 1 and 2, the printing section 12 is an ink jet printer with which a predetermined image is formed on the printing medium S. The image is configured by a plurality of dots of ink ejected from the nozzle modules 50, 52, 54, and 56 provided to the printing head 200. Such dots are formed while either the printing medium or the printing head 200 or both are moved. Together with the printing head 200, the printing section 12 is configured to include: a printing head feeding mechanism (with a multi-path printer); a paper feeding mechanism; and a printing control mechanism, all of which are not shown. Specifically, the printing head feeding mechanism reciprocates the printing head 200 in the width direction of the printing medium S, and the paper feeding mechanism moves the printing medium S. The printing control mechanism exercises control over the ink discharge from the printing head 200 based on the printing data.

Figure 2:
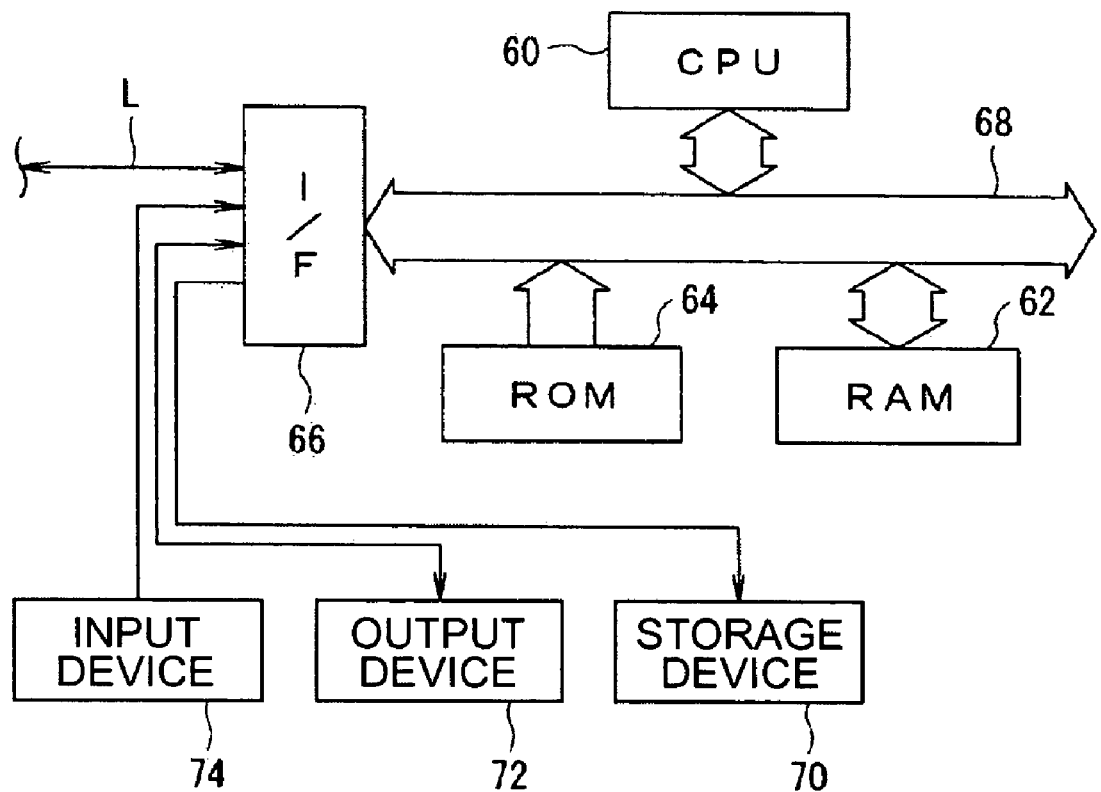
FIG. 2 is a diagram showing the hardware configuration of a computer system.

The printing device 100 is provided with a computer system for the purpose of implementing the component functions of the image data acquisition section 10, the printing data generation section 11, the printing section 12, and others, and running software of hardware control required for such component functions' implementation. As shown in FIG. 2, the computer system has such a hardware configuration that an In/Out bus 68 connects together a CPU (Central Processing Unit) 60, RAM (Random Access Memory) 62, and ROM (Read Only Memory) 64. The In/Out bus 68 varies in type, including PCI (Peripheral Component Interconnect) bus, ISA (Industrial Standard Architecture), or others. Herein, the CPU 60 takes charge of various control applications and computation. The RAM 62 serves as a main storage, and the ROM 64 is a storage device provided specifically for data reading. In the hardware configuration, the In/Out bus 68 is connected with, through an Input/Output interface (I/F) 66, the external storage device 70 (secondary storage) such as HDD, an output device 72, an input device 74, a network cable L for communications with a printing command device that is not shown, and others. Herein, the output device 72 is exemplified by the printing section 12, CRT, LCD monitor, or others, and the input device 74 by an operation panel, mouse, keyboard, scanner, or others.

When the printing device 100 is turned ON, the component functions as described above are implemented on the software by the CPU 60 applying predetermined control and performing computation by putting various resources to full use. For such control application and computation, the CPU 60 follows commands written in programs loaded to the RAM 62. The programs are those loaded by a system program such as BIOS stored in the ROM 64 or others, including various specific computer programs previously stored in the ROM 64 or installed in the storage device 70 via recording media including CD-ROMs, DVD-ROMs, flexible disks (FDs), or others, or via a communications network such as the Internet.

Figure 5:
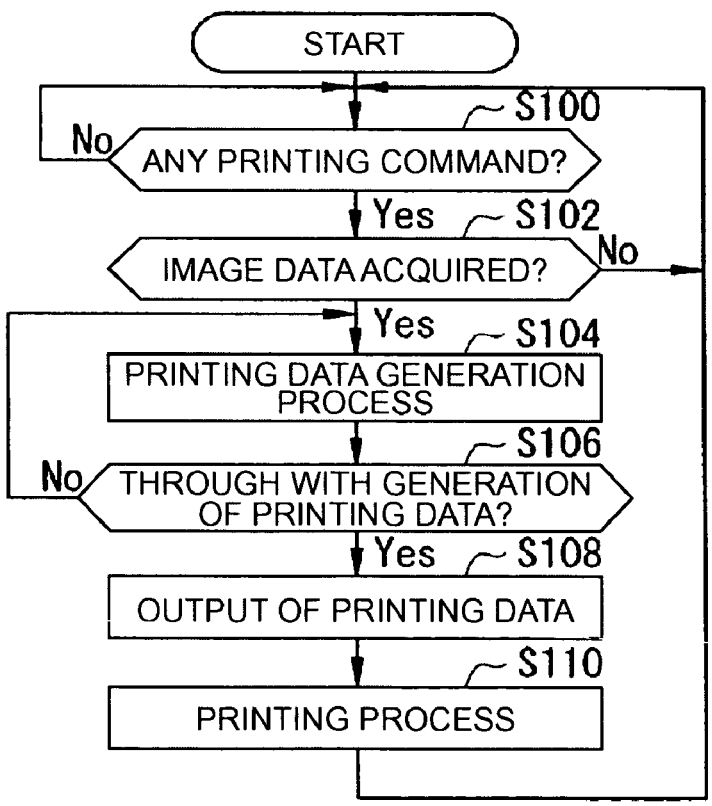
FIG. 5 is a flowchart of a printing process in the printing device 100.

The printing device 100 has the CPU 60 activated a predetermined program stored in any given region of the ROM 64, and in accordance with the program, executes the printing process in the flowchart of FIG. 5. As described above, the printing head 200 for dot formation is generally so configured as to form dots of various colors, e.g., four or six, substantially at the same time. For the sake of simplification, described below is an exemplary case in which every dot is presumably formed by the printing head 200 using a single color (monochrome color), and the resulting image is a monochrome image.

FIG. 5 is a flowchart of a printing process in the printing device 100.

As shown in FIG. 5, when executed by the CPU 60, the printing process is started from step S100.

In step S100, the image data acquisition section 10 determines whether a printing command is provided. Such a determination is made in response to printing command information coming from any external device connected through the network cable L, or printing command information coming via the input device 74. When the determination is made as Yes, the procedure goes to step S102, and when not (No), the determination process is repeated until a printing command comes.

In step S102, the image data acquisition section 10 goes through a process of acquiring image data corresponding to the printing command from recording media, the storage device 70, or others. The recording media include, as described above, external devices, CD-ROMs, DVD-ROMs, or others, and the storage device 70 includes HDDs or others. When the image data is determined as being acquired (Yes), the acquired image data is forwarded to the printing data generation section 11, and the procedure goes to step S104. When the determination is made as No, the image data acquisition section 10 makes a notification to tell the source of the printing command that the printing cannot be performed, for example, and terminates the printing process for the printing command. The procedure then returns to step S100.

The image data here is the one configured by a plurality of M-value pixel data disposed in matrix. The line direction of the image data is the same as the nozzle disposition direction in the printing head 200, and the column direction thereof is the same as the printing direction of the printing head 200.

In step S104, the printing data generation section 11 goes through a printing data generation process, and the procedure goes to step S106.

In step S106, the printing data generation section 11 makes a determination whether the printing data generation process is through. When the determination is made as Yes, the procedure goes to step S108, and when No, the procedure returns to step S104 to continue the process.

In step S108, the printing data generation section 11 outputs the printing data generated in step S104 to the printing section 12, and the procedure goes to step S110.

In step S110, the printing section 12 goes through the printing process based on the printing data provided by the printing data generation section 11. The procedure then goes to step S100.

By referring to FIG. 6, described next in detail is the printing data generation process in step S104.

Figure 6:
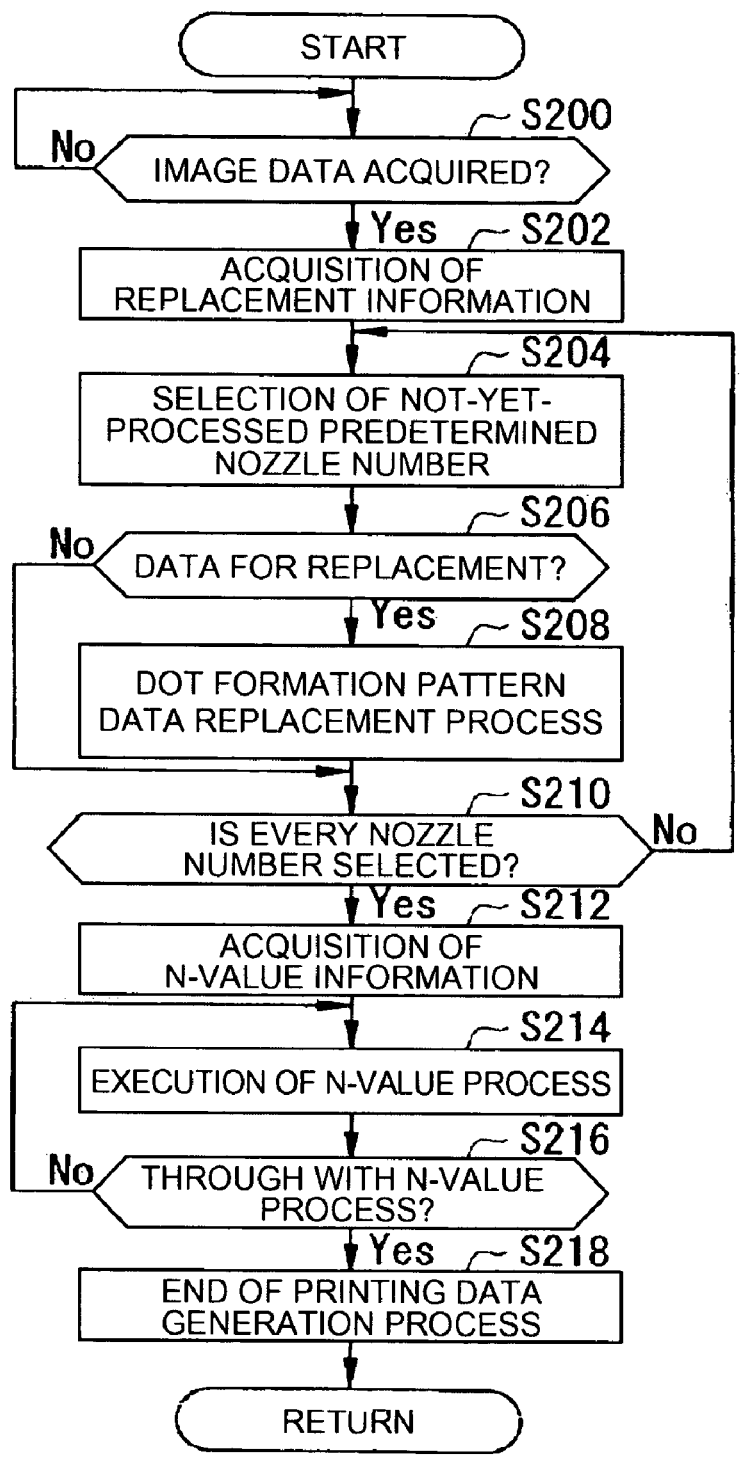
FIG. 6 is a flowchart of a printing data generation process in a printing data generation section 11 in the printing device 100.

FIG. 6 is a flowchart of the printing data generation process in the printing data generation section 11 in the printing device 100.

In the printing data generation process, data about dots taken charge by a nozzle relating to a banding problem is replaced with previously-provided banding avoiding dot formation pattern data so that printing data is generated. After such a printing data generation process is started in step S104, as shown in FIG. 6, the procedure first goes to step S200.

In step S200, the N-value process section 11a determines whether image data after CMYK conversion is provided by the image data acquisition section 10. When the determination is made as Yes, thus acquired image data is forwarded to the dot formation pattern replacement section 11c, and the procedure goes to step S202. When not (No), the determination process is repeated until the CMYK-converted image data comes.

In step S202, in the dot formation pattern replacement section 11c, replacement information is acquired from the replacement information storage section 11d, and the procedure goes to step S204.

The replacement information in the present embodiment includes information indicating whether the nozzles provided to the printing head 200 have something to do with the banding problem on a nozzle number basis. When any of the nozzles is relating to the banding problem, the replacement information also includes banding avoiding dot formation pattern data for the nozzle number. In the present embodiment, the banding avoiding dot formation pattern data is generated for every tone of the image data as a processing object.

In step S204, from the replacement information acquired in step S202, the dot formation pattern replacement section 11c selects any nozzle number that is not yet through with the replacement process, and is corresponding to printing of the image data. The procedure then goes to step S206.

In the present embodiment, four nozzles are basically regarded as being relating to a banding problem, i.e., a nozzle causing ink deflection, two nozzles on the left side thereof, and a nozzle on the right side thereof. Dot formation patterns corresponding to those four nozzles are replaced with banding avoiding dot formation patterns of a predetermined size that is previously provided to the replacement information storage section 11d. When nozzles causing ink deflection are located in a row or in a close range, with a consideration thereto, generated is banding avoiding dot formation pattern data that has different formation details from those of the above-described basic data, e.g., different pattern size.

In step S206, the dot formation pattern replacement section 11c determines whether the data about dots taken charge by the nozzle assigned with the nozzle number selected in step S204 is to be replaced. When the determination is made as Yes, the procedure goes to step S208, and when not (No), the procedure goes to step S210.

In step S208, the dot formation pattern replacement section 11c goes through a process of replacing the data about dots taken charge by the replacing nozzle number in the image data acquired in step S200 with banding avoiding dot formation pattern data corresponding to the dithering level of the dot formation pattern for the data. The procedure then goes to step S210.

Herein, as described above, the banding avoiding dot formation pattern data is provided as many as the "nozzles relating to a banding problem". When there is no difference in the number of nozzles, the banding avoiding dot formation pattern data provided for every tone is used for the replacement process. In the present embodiment, two processing modes are available for selection. One processing mode is of replacing data about dots taken charge by each of the nozzles relating to the banding problem entirely with banding avoiding dot formation pattern data. Such a mode is hereinafter referred to as continuous replacement mode. The other processing mode is of partially replacing the data, and such a mode is hereinafter referred to as decimation replacement mode.

In step S210, the dot formation pattern replacement section 11c determines whether every nozzle number for the image data is selected. When the determination is made as Yes, the image data after the replacement process is forwarded to the N-value process section 11a, and the procedure goes to step S212. When not (No), the procedure returns to step S204.

In step S212, after acquiring the image data through with the replacement process from the dot formation pattern data replacement section 11c, the N-value process section 11a acquires from the N-value information storage section 11b N-value information needed for the N-value process. The procedure then goes to step S214.

In the present embodiment, the N-value information includes a density threshold value as a determination factor for whether or not to form dots for various dot formation sizes, and a density value corresponding to each of the dot formation sizes. That is, through comparison with the density threshold value, when a specific value (density value) of pixel data as a part of image data is equal to or larger than the density threshold value, a determination is made that dots of the size are to be formed. When the value is smaller than the threshold value, a determination is made that dots of the size are not to be formed.

In step S214, the N-value process section 11a applies the N-value process to the remaining image data, i.e., data not including the part having been subjected to the replacement process in step S208. The procedure then goes to step S216.

Figure 7:
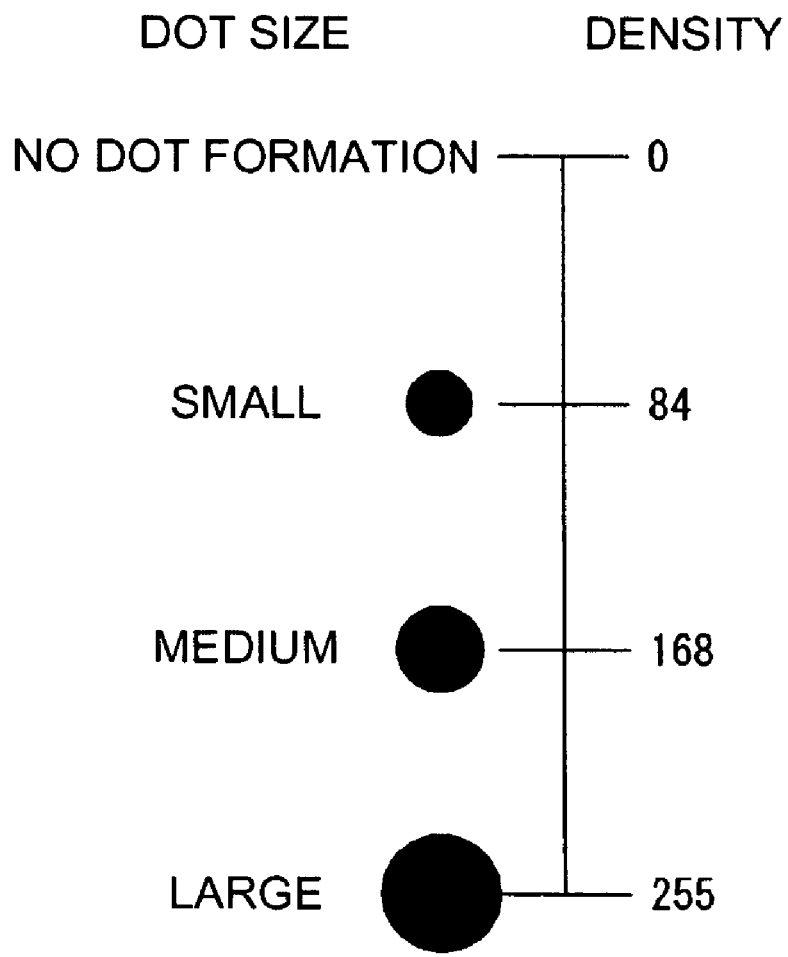
FIG. 7 is a diagram showing exemplary dot sizes possibly formed by nozzles N.

In the N-value process, based on the determination result derived through comparison with the density threshold value. The density value of the pixel data is converted into "1" when the determination is made as forming dots. On the other hand, when the determination is made as not forming dots, the density value is converted into "0". If some indicate the value of "1" indicating dot formation, the largest dot size is selected therefrom to regard it as the dot formation size for the pixel data, and the information about the dot formation size, i.e., size identification information, is correlated to the value of "1" indicating dot formation. This establishes a correlation between information about the dot formation sizes and the dot formation sizes. As shown in FIG. 7, in the present embodiment, there are four dot formation sizes of "small", "medium", "large", and "no dot formation" depending on the density value, and it thus means that quarterization is substantially executed. For the N-value process in the present embodiment, an error diffusion technique can be adopted for representation of dithering levels, and for any text-devoted process, value determination may be made simply by comparing threshold values of pixels. Alternatively, the technique of dithering or others may be adopted also for representation of dithering levels.

In step S216, the N-value process section 11a determines whether the N-value process is through. When the determination is made as Yes, the image data through with the N-value process is forwarded to the dot formation pattern replacement section 11c as printing data, and the procedure goes to step S218. When the determination is made as No, the procedure returns to step S214 to continue the N-value process.

The printing data includes information about forming dot or not, and if with dot formation, the dot size identification information.

In step S218, after the dot formation pattern replacement section 11c acquires the printing data from the N-value process section 11a, the printing data generation section 11 ends the printing data generation process, and the procedure returns.

Described next is the operation of the present embodiment by referring to FIGS. 8A to 11B.

Figure 8A:
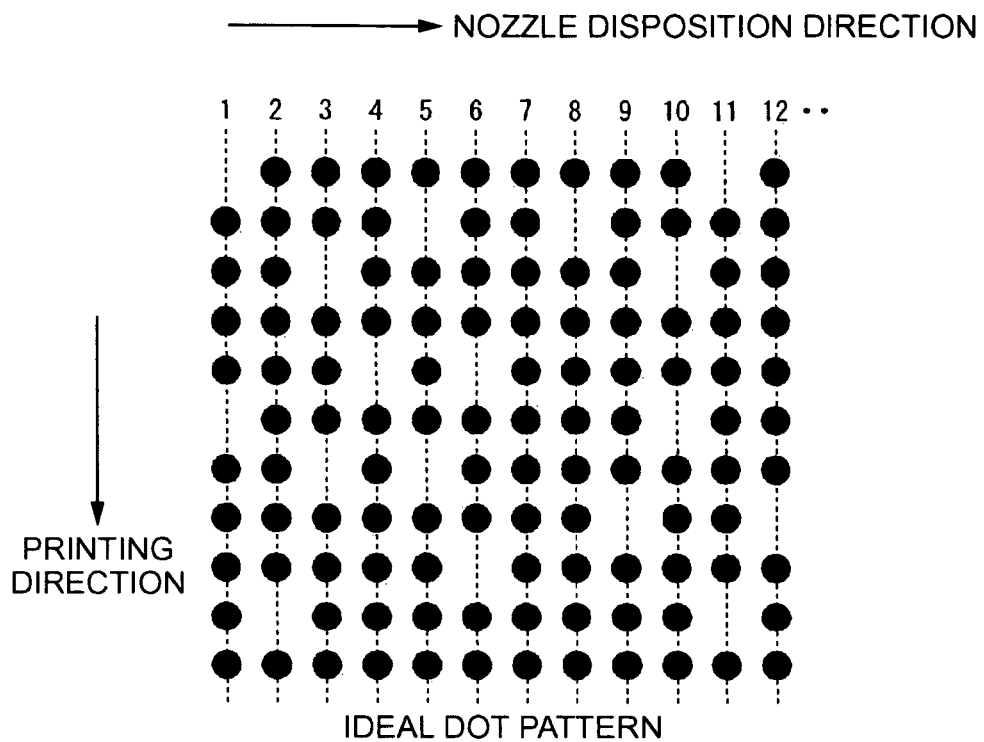
FIG. 8A is a diagram showing an exemplary dot pattern to be formed only by a black nozzle module 50, which includes no faulty nozzle as a cause of ink deflection.
Figure 8B:
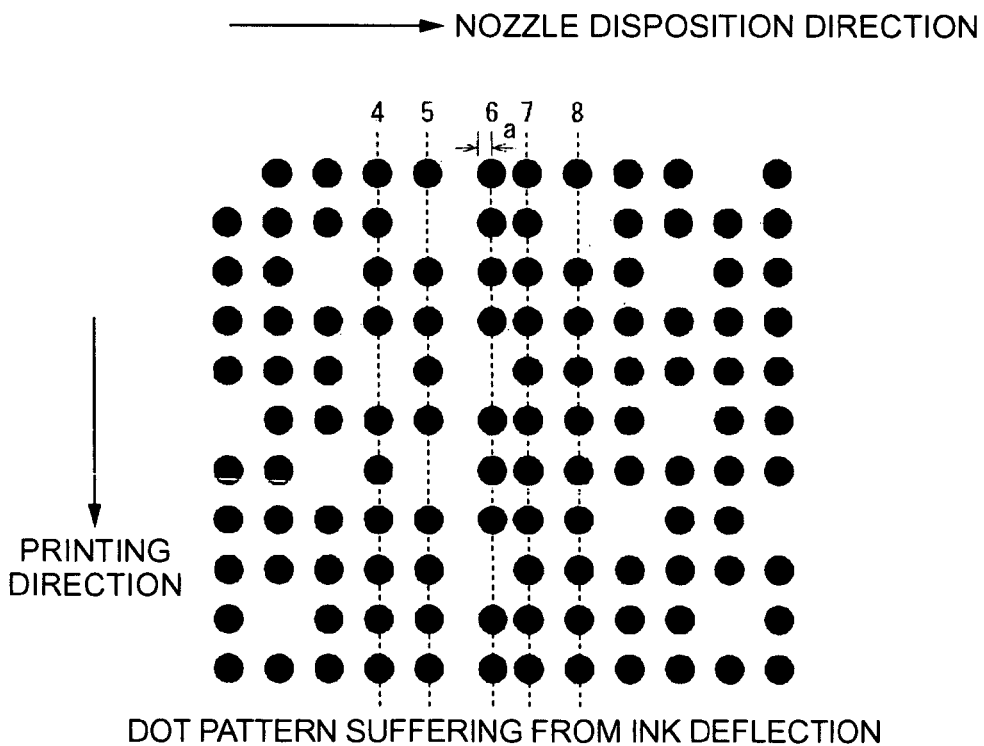
FIG. 8B is a diagram showing an exemplary dot pattern to be formed by the black nozzle module 50 in which a nozzle N6 is a cause of ink deflection.
Figure 11A:
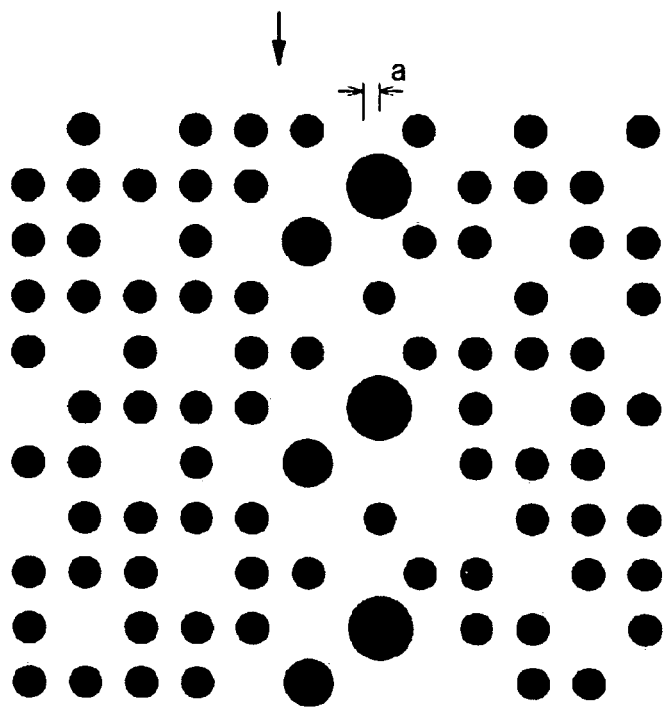
FIG. 11A is a diagram showing an exemplary dot pattern that is formed based on printing data generated with consideration of ink deflection observed to the nozzle N6 in the continuous replacement mode.
Figure 11B:
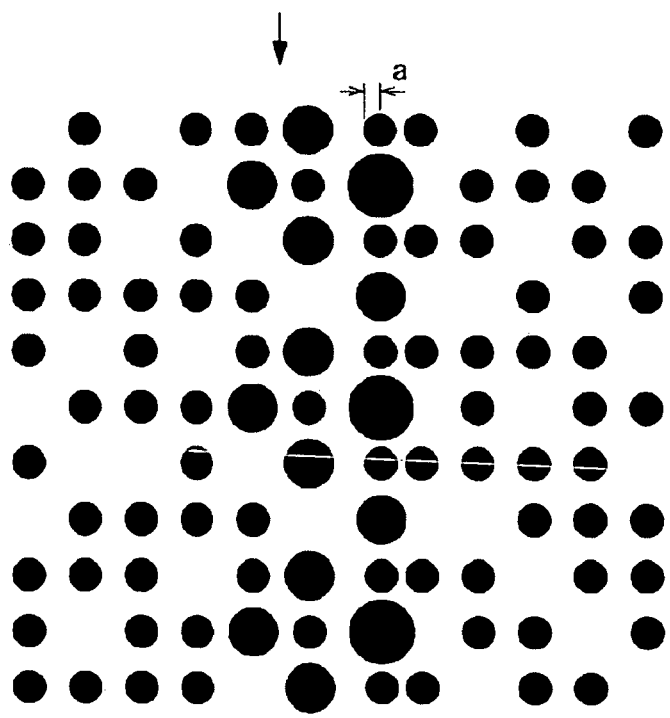
FIG. 11B is a diagram showing an exemplary dot pattern that is formed based on printing data generated with consideration of ink deflection observed to the nozzle N6 in the decimation replacement mode.

FIG. 8A is a diagram showing an exemplary dot pattern to be formed only by the black nozzle module 50, which includes no faulty nozzle as a cause of ink deflection. FIG. 8B is a diagram showing an exemplary dot pattern to be formed by the black nozzle module 50 in which the nozzle N6 is assumed as being a cause of ink deflection. FIG. 9A is a diagram showing an exemplary banding avoiding dot formation pattern for a dithering level with a density value of 63. FIG. 9B is a diagram showing an exemplary banding avoiding dot formation pattern for a dithering level with a density value of 95. FIG. 10A is a diagram showing an exemplary replacement pattern in a continuous replacement mode. FIG. 10B is a diagram showing an exemplary replacement pattern in a decimation replacement mode. FIG. 11A is a diagram showing an exemplary dot pattern formed based on the printing data generated with consideration given to ink deflection occurring to the nozzle N6 in the continuous replacement mode. FIG. 11B is an exemplary dot pattern that is formed based on printing data generated with consideration given to ink deflection occurring to the nozzle N6 in the decimation replacement mode.

As shown in FIG. 8A, a dot pattern formed by the black nozzle module 50 including no faulty nozzle causing ink deflection is free from a banding problem as "white streaks" or "dark streaks" as described above. The banding problem is resulted from any displacement of nozzle interval.

On the other hand, FIG. 8B shows the printing result by the black nozzle module 50 including a faulty nozzle causing ink deflection. In the dot pattern, the dots formed by the faulty nozzle N6 are displaced by a distance a toward the dots formed by the correct nozzle N7 on the right side. As a result, a white streak is observed between the dots formed by the nozzle N6 and the dots formed by the nozzle N5 on the left side.

The "white streaks" look pretty conspicuous when the printed image of uniform density, and when color difference is considerably big, e.g., printing paper of white and ink of black. As a result, the quality of the printing result is considerably degraded.

As an alternative to the black nozzle module 50, when any other nozzle module 52, 54, or 56 corresponding to any other colors is used, due to the displacement of the nozzle N6 by the distance a as a result of ink deflection, the distance between the nozzle N6 and the nozzle N7 on the right side becomes narrower by the distance a so that the dot density is increased in the area taken charge by such nozzles (the dots may be overlaid one another therein). As a result, the part looks conspicuous as a "dark streak". In this case, the quality of the printing result is also conspicuously degraded.

As such, prior to generating printing data, the printing device 100 of the invention replaces, with banding avoiding dot formation pattern data, data about dots configured by pixel data corresponding not only to the faulty nozzle N6 but also to any neighboring nozzles. In this manner, "white streaks" or "dark streaks" can be made less noticeable.

When the printing data acquisition section 10 receives printing command information from any external device or others (step S100), the printing device 100 acquires image data corresponding to the printing command information from the external device or others being the source of the printing command information. In the acquired image data, color information (RGB) is converted into CMYK, and the resulting image data is forwarded to the printing data generation section 11 (step S102). After acquiring the image data from the image data acquisition section 10, the printing data generation section 11 goes through a printing data generation process (step S104).

The printing data generation process is started in response when the N-value process section 11a determines that the image data is acquired (step S200). The dot formation pattern replacement section 11c then reads out replacement information from the replacement information storage section 11d for storage into a predetermined region of the RAM 62 so that the replacement information is acquired (step S202). The replacement information includes information about whether each nozzle number is relating to a banding problem, and banding avoiding dot formation pattern data. In the present embodiment, as shown in FIGS. 9A and 9B, the banding avoiding dot formation pattern data is data for forming a dot portion of 4 dots by 4 dots. FIG. 9A shows a banding avoiding dot formation pattern for a dithering level with a density value of "63", and FIG. 9B shows a banding avoiding dot formation pattern for a dithering level with a density level of "95". Although exemplified here are cases with the density values of "63" and "95", other than these, banding avoiding dot formation pattern data is provided for each tone with a density value.

Based on the acquired image data, the dot formation pattern replacement section 11c searches the replacement information in the RAM 62 for a nozzle number corresponding to the nozzle for use of printing the image data (step S204). The dot formation pattern replacement section 11c then determines whether the data about the dots taken charge by the nozzle with the selected nozzle number is the data to be replaced as is being related to the banding problem (step S206).

In the present embodiment, basically, the nozzle numbers to be selected are four nozzle numbers corresponding to four pixel columns arranged in a row around a part observed with the banding problem in the image data. For example, as already described above, the 6th nozzle in the printing head 200 is observed with ink deflection so that the nozzle-to-nozzle distance between the 5th and 6th nozzles is wider than usual. As such, selected nozzle numbers are 4, 5, 6, and 7.

When the dot formation pattern replacement section 11c determines that the data about the dots taken charge by the selected nozzle number is data for replacement (Yes in step S206), the replacement process is executed in either a continuous replacement mode or a decimation replacement mode, which is set by a user, for example (step S208).

Assuming that the dot formation pattern for a nozzle selected as a replacement target has the density value of "63" in the continuous replacement mode, as shown in FIG. 10A, the dot data corresponding to the selected nozzle is entirely replaced with the banding avoiding dot formation pattern data corresponding to the density value of "63". More in detail, as an alternative to the original dot data, the banding avoiding dot formation pattern of FIG. 9A, i.e., the pattern having the size of 4 dots by 4 dots, and being corresponding to the density value of "63", is disposed plurally in a row.

On the other hand, assuming that the dot formation pattern for a nozzle selected as a replacement target has the density value of "95" in the decimation replacement mode, as shown in FIG. 10B, the dot data corresponding to the selected nozzle is partially replaced with the banding avoiding dot formation pattern data corresponding to the density value of "95". More in detail, as an alternative to a part of the original dot data, the banding avoiding dot formation pattern of FIG. 9B, i.e., the pattern having the size of 4 dots by 4 dots, and being corresponding to the density value of "95", is irregularly disposed as if the part had been decimated with the original data interposed at some point.

After such a replacement process is through for the dot data of every nozzle number (Yes in step S210), the image data through with the replacement process is forwarded to the N-value process section 11a.

After acquiring the image data through with the replacement process from the dot formation pattern replacement section 11c as such, the N-value process section 11a reads out the N-value information from the N-value information storage section 11b for storage into a predetermined region of the RAM 62 so that the N-value information is acquired (step S212). As described above, the N-value information includes a threshold value for each dot formation size information and a density value for use for the N-value process. As shown in FIG. 7, as to the density value for each of the dot formation size information, the density value of "84" is corresponding to small dots, the density value of "168" to medium dots, and the density value of "255" to large dots.

After acquiring the N-value information, the N-value process section 11a executes the N-value process with respect to any not-yet-replaced part of the image data based on the N-value information. In the present embodiment, the error diffusion technique is adopted for the N-value process so that the tone representation is enabled using the dithering level.

The error diffusion is a well-known technique, and when M-value data is subjected to the N-value process with a specific threshold value, any difference from the threshold value is not neglected but diffused as an error for pixels to be processed. Assuming that a processing-target pixel is of 8 bits (256 tones) with a tone of "101" in binarization, the tone is smaller than "128" being the threshold value (median value). In the normal binarization, the pixel is thus processed as a pixel of "0" formed with no dot, and the tone "101" is neglected. On the other hand, in the error diffusion, the tone "101" is diffused among its around not-yet-processed pixels in accordance with any predetermined error diffusion matrix. By taking a pixel right of the target pixel as an example, in the normal binarization, it is to be processed as "no dot formation" as is not satisfying the threshold value similarly to the target pixel. With the error diffusion from the target pixel, however, the density value of the pixel exceeds the threshold value, and thus can be processed as "dot formation". As such, the resulting binary data can be much closer to the original image data.

The density value for every dot formation size is used with error diffusion, and any difference between the density value of the original pixel data and the density value of any corresponding dot formation size after the N-value process is diffused as an error among the not-yet-processed pixel data in the close range.

More in detail, assuming that processing-target pixel data indicates the density value of a in the error diffusion, with the dot density of FIG. 7, dots of the size "small" are formed if with "42≦α<126", i.e., the value of "1". If with "α<42 or 126≦α", no dot is formed, i.e., the value of "0". Similarly, for the medium-sized dots, the value will be "1" if with "126≦α<210", and the value will be "0" if with "α<126", and "210≦α". For the large-sized dots, the value will be "1" if with "210≦α", and the value will be "0" if with "α<210". That is, based on such comparison results, if some of the three dot sizes indicate the value of "1" indicating dot formation, the largest dot size is selected therefrom. If none of the three dot sizes indicates the value of "0" indicating no dot formation, the value of "0" is selected. As such, every pixel data is converted into either the value of "1" or "0", indicating forming dots of any one size of the above three, or forming no dot. For example, a value indicating dot formation of the "large" size is "L1", which is the value of "1" indicating dot formation plus information about size. Similarly, the value of the "medium" size is "M1", and the value of the "small" size is "S1". In this case, the pixel data is converted into either any one of these values or "0" indicating no dot formation. After such conversion, a difference is calculated between the value of the original pixel data and the value after conversion, and the resulting difference is diffused among any not-yet-processed pixels in the vicinity of the original pixel as an error.

The technical method for controlling dot size as such includes a technique of providing piezo actuator to a printing head. Such a technique is easily implemented by controlling the ink discharge amount through voltage change for application to the piezo actuator.

In the error diffusion process in the present embodiment, for example, neglecting the pixel data of the replaced part, the error is diffused to the next not-yet-processed pixel.

After the N-value process is through with every pixel data without the replaced part (step S216), the resulting image data having been through with the replacement process and the N-value process is regarded as printing data, and when the printing data is generated as such, this is the end of the printing data generation process (step S218). As such, it is determined that the printing data is generated (step S106), and the printing data is output to the printing section 12 (step S108).

Based on the printing data thus provided by the printing data generation section 11, the printing section 12 uses the black nozzle module 50 to perform dot formation (printing) on a printing medium (step S110). As shown in FIG. 11A or 11B, a dot formation pattern for the part where the banding problem is observed is replaced with a dot formation pattern for banding avoidance. The formation result of FIG. 8B is derived for the case where the banding problem is observed with no consideration for the fact that nozzle N6 is causing ink deflection, i.e., no replacement is performed. From a macroscopic viewpoint, compared with such an ideal printing result of FIG. 8A, the image texture is not smooth that much. However, compared with the printing result of FIG. 8B with no consideration to ink deflection, the phenomenon acknowledged as white and dark streaks can be made less noticeable, thereby improving the image quality in its entirety.

What is better, any replacement-target data is simply replaced with banding avoiding dot formation pattern data that is previously prepared so that banding-free printing data can be generated at high speed.

In the first embodiment above, the image data acquisition section 10 corresponds to the image data acquisition unit of the first or thirty-seventh aspect. The printing data generation section 11 corresponds to the printing data generation unit in any one of the aspects of first, second, third, fourth, fifth, thirty-seventh, thirty-eighth, thirty-ninth, fortieth, and forty-first. The printing section 12 corresponds to the printing unit of the first aspect.

In the first embodiment above, step S102 corresponds to acquiring in any one of the aspects of fourteenth, twenty-sixth, forty-eighth, and sixtieth. Step S104 corresponds to generating in any one of the aspects of fourteenth, fifteenth, sixteenth, seventeenth, eighteenth, twenty-sixth, twenty-seventh, twenty-eighth, twenty-ninth, thirtieth, forty-eighth, forty-ninth, fiftieth, fifty-first, fifty-second, sixtieth, sixty-first, sixty-second, sixty-third, and sixty-fourth. Step S110 corresponds to printing of the fourteenth or twenty-sixth aspect.

Second Embodiment

Described next is a second embodiment of the invention by referring to the accompanying drawings. FIGS. 12 to 16B are all a diagram showing the second embodiment of the invention, i.e., a printing device, a printing device control program and method, and a printing data generation device, program, and method.

In the second embodiment, the printing device and the computer system both are in the similar configuration as those in the first embodiment shown in FIGS. 1 and 2. The second embodiment is different from the first embodiment in the respect that the printing data generation process in step S104 of FIG. 5 is replaced with the process of FIG. 12.

Figure 12:
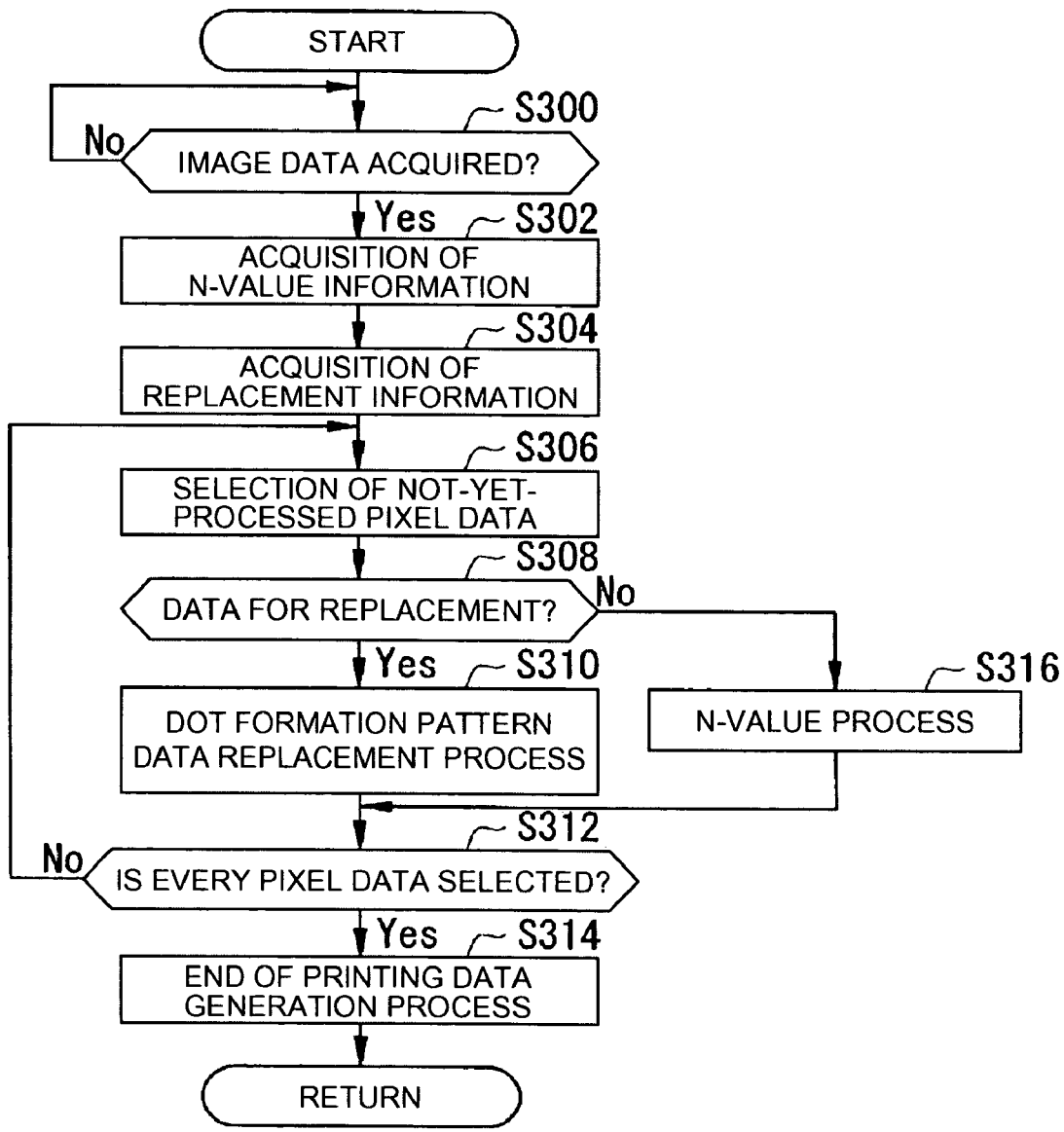
FIG. 12 is a flowchart of a printing data generation process in the printing data generation section 11 of the printing device 100.

Although the printing data generation process of FIG. 12 is the same as that of the first embodiment in principle, differences lie in the following respects. That is, a replacement process is executed at the same time as an N-value process, and banding avoiding dot formation pattern data for use of replacement based on nozzle information is different in details and replacement manner. In the below, described are only such differences from the first embodiment, avoiding redundant description.

By referring to FIG. 12, described next in detail is a printing data generation process of step S104 in the present embodiment.

FIG. 12 is a flowchart of a printing data generation process in the printing data generation section 11 of the printing device 100.

In the printing data generation process, data about dots taken charge by a nozzle relating to a banding problem is replaced with banding avoiding dot formation pattern data that is provided in advance so that printing data is generated. After such a printing data generation process is executed in step S104, as shown in FIG. 12, the procedure first goes to step S300.

In step S300, the N-value process section 11a determines whether image data through with CMYK conversion is provided by the image data acquisition section 10. When the determination is made as Yes, thus acquired image data is forwarded to the dot formation pattern replacement section 11c, and the procedure goes to step S302. When not (No), the determination process is repeated until the CMYK-converted image data is acquired.

In step S302, from the N-value information storage section 11b, the N-value process section 11a acquires N-value information needed for the N-value process, and notifies the dot formation pattern replacement section 11c of starting the N-value process, and the procedure goes to step S304.

In step S304, after receiving the notification from the N-value process section 11a, the dot formation pattern replacement section 11c acquires replacement information, and the procedure goes to step S306.

The replacement information in the present embodiment includes information about nozzles provided to the printing head 200 on a nozzle number basis, i.e., information about dot formation position. Also included is information about banding avoiding dot formation pattern data in a case where any nozzle whose dot formation position is displaced from the ideal dot formation position by a predetermined distance or more, i.e., any nozzle causing ink deflection.

In the present embodiment, for any specific dithering level, banding avoiding dot formation pattern data varying in formation pattern details, i.e., dot formation position and pattern size, is provided. By combining together such banding avoiding dot formation pattern data, replacement is performed for the data of a part observed with a banding problem.

In step S306, the dot formation pattern replacement section 11c selects any pixel data that is not yet through with the replacement process and the N-value process, and the procedure goes to step S308.

In step S308, based on the replacement information acquired in step S304, the dot formation pattern replacement section 11c determines whether a nozzle corresponding to pixel data selected in step S306 (hereinafter, referred to as selected pixel data) is observed with ink deflection. Through such a determination, the dot formation pattern replacement section 11c determines whether the selected pixel data is supposed to be replaced. When the determination is made as Yes, the procedure goes to step S310, and when No, the procedure goes to step S316. That is, when some ink deflection is occurring to the nozzle corresponding to the selected pixel data, the pixel data is determined as being the replacing data, and when no ink deflection is occurring thereto, the pixel data is determined as not being the replacing data.

In step S310, the dot formation pattern replacement section 11c goes through a process of replacing the replacing pixel data with banding avoiding dot formation pattern data for the dithering level of a dot formation pattern of the pixel data. The procedure then goes to step S312.

In the present embodiment, the banding avoiding dot formation pattern data is provided as many as the "nozzles relating to a banding problem". When there is no difference in the number of nozzles, the banding avoiding dot formation pattern data plurally provided for each tone are used for the replacement process.

In the present embodiment, two processing modes are available for selection. One processing mode is of replacing data about dots corresponding to a nozzle relating to a banding problem with a combination of banding avoiding dot formation pattern data. The banding avoiding dot formation patter data are all of the same pattern size, but different in formation pattern details for the same dithering level. Such a mode is hereinafter referred to as combined continuous replacement mode. The other processing mode is of replacing the data with a combination of banding avoiding dot formation pattern data varying in pattern size and formation pattern details for the same dithering level. Such a mode is hereinafter referred to as size combined continuous replacement mode.

In step S312, the dot formation pattern replacement section 11c determines whether every pixel data in the image data is through with the N-value process and the replacement process. When the determination is made as Yes, the procedure goes to step S314. When not (No), the procedure returns to step S306. In the present embodiment, the image data through with the N-value process and the replacement process is the printing data.

In step S314, the printing data generation section 11 ends the printing data generation process, and the procedure returns.

When the selected pixel data is determined as not being the replacing data in step S308, and when the procedure thus goes to step S316, the N-value process section 11a executes the N-value process with respect to the selected pixel data based on the N-value information acquired in step S302. The procedure then goes to step S312. Here, the data through with the N-value process is forwarded to the dot formation pattern replacement section 11c.

Described next is the operation of the present embodiment by referring to FIGS. 13A to 16B.

Figure 13A:
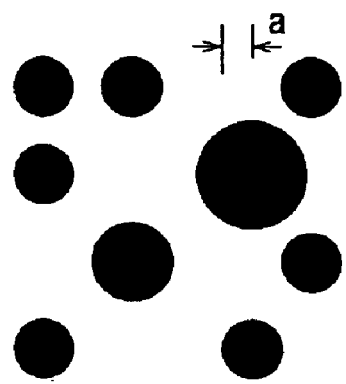
FIGS. 13A to 13C are all a diagram showing a plurality of exemplary banding avoiding dot formation patterns available for a dithering level with a density value of 63.
Figure 13B:
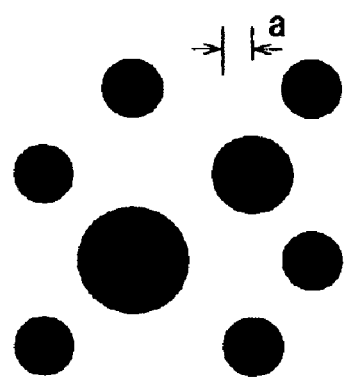
Figure 13C:
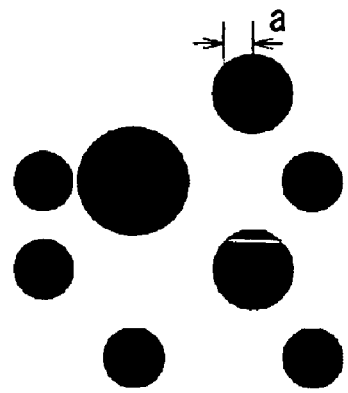
Figure 14A:
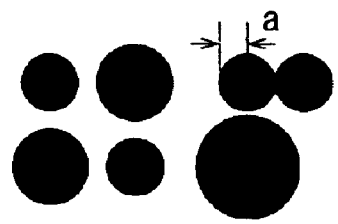
FIGS. 14A to 14C are all a diagram showing a plurality of exemplary banding avoiding dot formation patterns varying in pattern size.
Figure 14B:
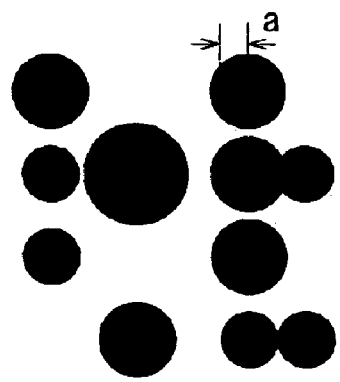
Figure 14C:
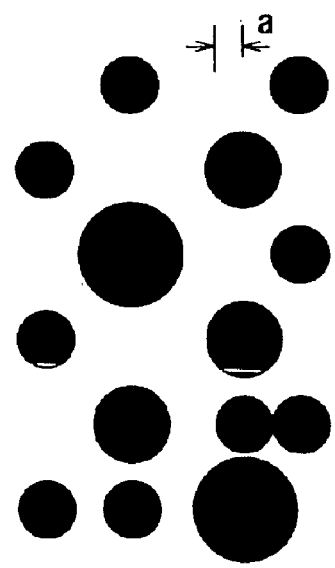
Figures 15A, 15B:
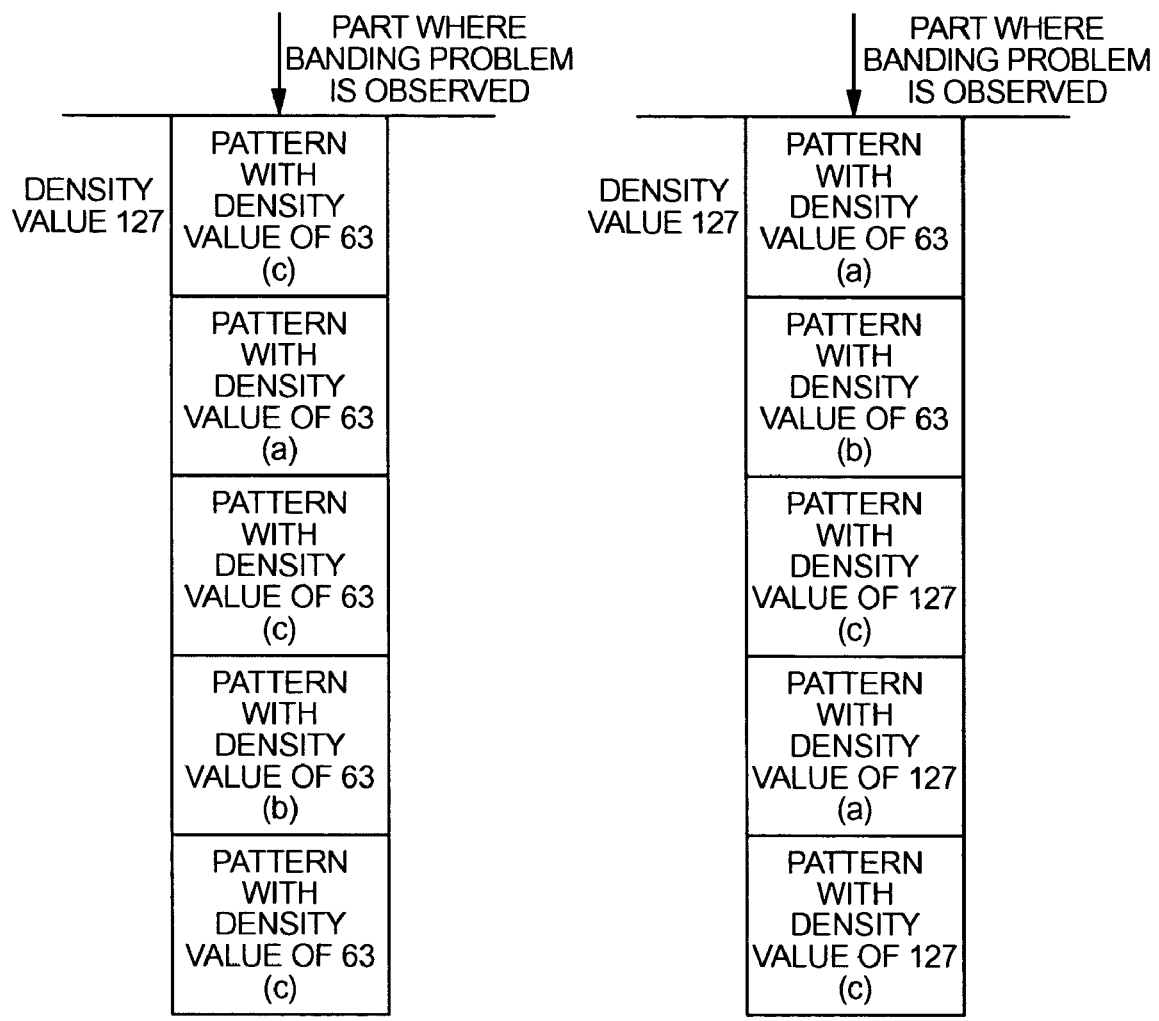
FIG. 15A is a diagram showing an exemplary replacement pattern in a combined continuous replacement mode.
FIG. 15B is a diagram showing an exemplary replacement pattern in a size combined continuous replacement mode.
Figure 16A:
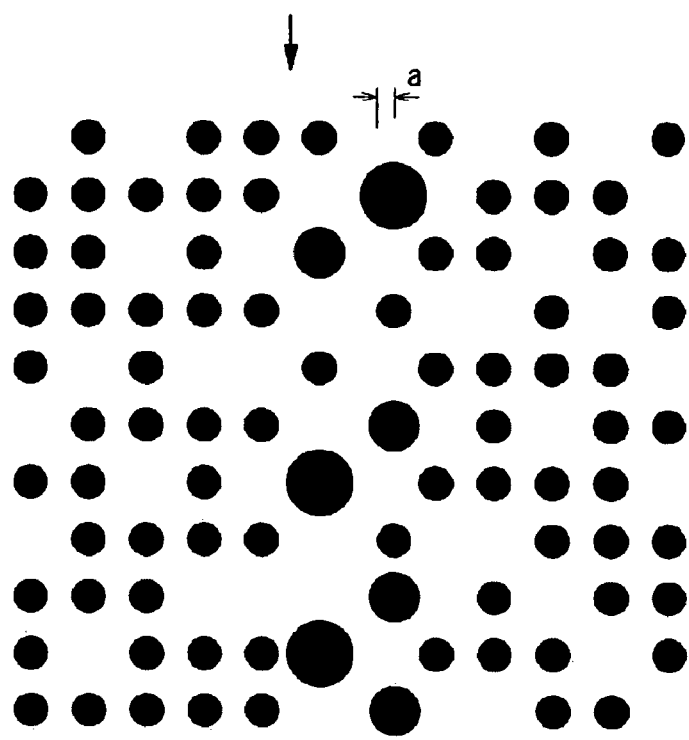
FIG. 16A is a diagram showing an exemplary dot pattern that is formed based on printing data generated with consideration of ink deflection observed to the nozzle N6 in the combined continuous replacement mode.
Figure 16B:
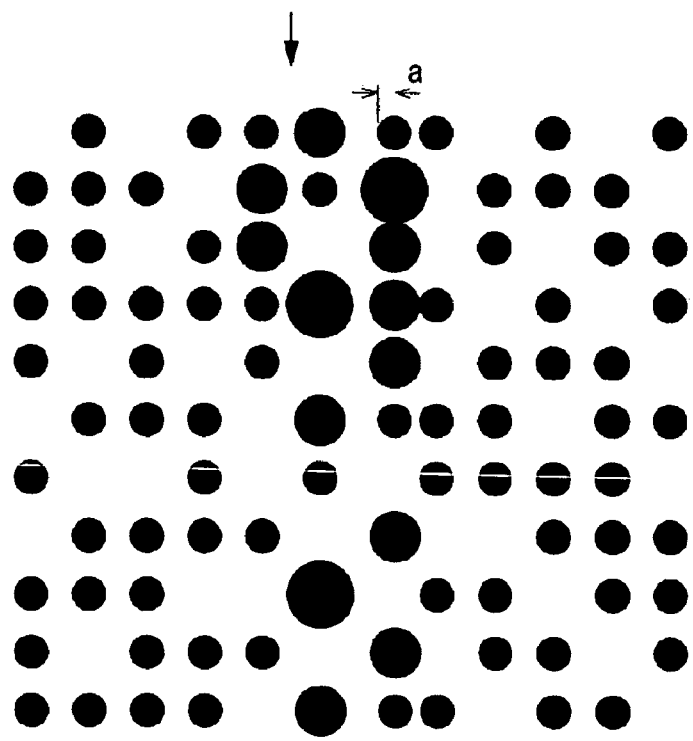
FIG. 16B is a diagram showing an exemplary dot pattern that is formed based on printing data generated with consideration of ink deflection observed to the nozzle N6 in the size combined continuous replacement mode.

FIGS. 13A to 13C are all a diagram showing a plurality of exemplary banding avoiding dot formation patterns available for a dithering level with a density value of 63. FIGS. 14A to 14C are all a diagram showing a plurality of exemplary banding avoiding dot formation patterns varying in pattern size. FIG. 15A is a diagram showing an exemplary replacement pattern in a combined continuous replacement mode. FIG. 15B is a diagram showing an exemplary replacement pattern in a size combined continuous replacement mode. FIG. 16A is a diagram showing an exemplary dot pattern that is formed based on printing data generated with consideration of ink deflection observed to the nozzle N6 in the combined continuous replacement mode. FIG. 16B is a diagram showing an exemplary dot pattern that is formed based on printing data generated with consideration of ink deflection observed to the nozzle N6 in the size combined continuous replacement mode.

Also in the present embodiment, as shown in FIG. 8B of the first embodiment, ink deflection is observed to the nozzle N6 in the black nozzle module 50. In the dot pattern, the dots formed by the nozzle N6 are displaced by the distance a toward the dots formed by the correct nozzle N7 on the right side. As a result, a white streak is observed between the dots formed by the nozzle N6 and the dots formed by the nozzle N5 on the left side.

The printing data generation process in this embodiment is started in response when the N-value process section 11a determines that the image data is acquired (step S300). The N-value process section 11a also reads out N-value information from the N-value information storage section 11b for storage into a predetermined region of the RAM 62 so that the N-value information is acquired (step S302). After acquiring the N-value information as such, the N-value process section 11a then notifies the dot formation pattern replacement section 11c of starting the N-value process. In the present embodiment, the image data acquired by the N-value process section 11a is stored in a memory region of the RAM 62 sharing with the dot formation pattern replacement section 11c.

After receiving the notification from the N-value process section 11a that the N-value process is to be started, the dot formation pattern replacement section 11c reads out replacement information corresponding to the currently-set mode from the replacement information storage section 11d. Thus read information is stored into the predetermined region of the RAM 62 so that the replacement information is acquired (step S304).

The replacement information in the present embodiment includes information about nozzles provided to the printing head 200 corresponding to every nozzle number, i.e., information about dot formation position. Also included is information about banding avoiding dot formation pattern data in a case where any nozzle whose dot formation position is displaced from the ideal dot formation position by a predetermined distance or more, i.e., any nozzle causing ink deflection. The banding avoiding dot formation pattern data for the combined continuous replacement mode is different from that for the size combined continuous replacement mode.

In the present embodiment, as shown in FIGS. 13A to 13C, for the combined continuous replacement mode, the banding avoiding dot formation pattern data varies in formation pattern details, i.e., 3 types, for a density value (density value of "63" in the drawing), for example. These banding avoiding dot formation pattern data are all used to form a dot formation pattern of a size (the number of dots) of about 4 dots by 4 dots. That is, in the present embodiment, every density value, e.g., 0 to 255, is provided with banding avoiding dot formation pattern data of the same size but varying in dot formation pattern details, i.e., three types.

In the present embodiment, the banding avoiding dot formation pattern data in the size combined continuous replacement mode has, as shown in FIGS. 14A to 14C, three patterns of each different size, i.e., each having the different number of dots, of "4 dots by 2 dots", "4 dots by 4 dots", and "4 dots by 6 dots" for a density value (in this example, the density value of "63"). That is, in the present embodiment, three types of banding avoiding dot formation pattern are provided for each density value.

In the present embodiment, as described above, there are three types of formation pattern details and formation pattern sizes, respectively. This is surely not restrictive, and two, or four or more will do.

Based on the image data stored in the common memory region, the dot formation pattern replacement section 11c selects any pixel data in the image data not yet through with the replacement process. The dot formation pattern replacement section 11c determines whether or not the nozzles are causing ink deflection. The determination factor is information about nozzles corresponding to the pixel data in the replacement information and other neighboring nozzles (hereinafter, referred to as corresponding nozzle module). In the present embodiment, when ink deflection is smaller in value than a predetermined value, it is determined that no ink deflection is occurring. The displacement amount information includes, specifically, the displacement amount for each of the nozzles N indicating how much its actual dot formation position is away from an ideal dot formation position, i.e., amount of ink deflection, and information indicating a pitch of dots to be formed by each of the nozzles N, center-to-center distance between any adjacent dots.

When the ink deflection is larger in value than the predetermined value, it is determined that the corresponding nozzle module for the selected pixel data carries any nozzle causing ink deflection. Through such a determination, the selected pixel data is determined as being data for replacement (Yes in step S308). Thereafter, from the replacement information, a selection is made for the banding avoiding dot formation pattern data corresponding to the density value of the dot formation pattern corresponding to the nozzle module including the selected pixel data. In thus selected banding avoiding dot formation pattern data, data corresponding to the selected pixel data is replaced with the selected pixel data so that the image data stored in the common memory is overwritten by the image data after replacement as such (step S310). In the present embodiment, the replacement process is executed by following the processing method in the user-set mode of either the combined continuous replacement mode or the size combined continuous replacement mode.

Considered here is a case where the density value is "63" for a dot formation pattern corresponding to the corresponding nozzle module of the selected pixel data that is set to the combined continuous replacement mode for replacement. As shown in FIG. 15A, the data about dots corresponding to the corresponding nozzle module is entirely replaced with a combination of three banding avoiding dot formation pattern data for the density value of "63". That is, as an alternative to the original dot data, the three banding avoiding dot formation pattern data of 4 dots by 4 dots corresponding to the density value "63" is disposed plurally in a row. Here, as a method for replacement through combination of three banding avoiding dot formation pattern data, two techniques are possible options. That is, one technique is of sequentially selecting one pattern from three patterns of FIGS. 14A to 14C at random, and disposing the selected pattern in order of selection. The other technique is of disposing the patterns in such a manner that any-one specific-pattern among the three patterns is not to be arranged in a row. More in detail, assuming that the three patterns of FIGS. 14A to 14C are of patterns a to c, respectively, the pattern disposition will be pattern a, pattern b, pattern c, pattern a, pattern b, pattern c, and the like.

As a result of replacement in such a manner as above, as exemplarily shown in FIG. 15A, the three patterns sharing the same formation details are not disposed in a row but irregularly.

Considered here is another case with the density value "63", for a dot formation pattern corresponding to the corresponding nozzle module for the selected pixel data in the size combined continuous replacement mode for replacement. With this being the case, as shown in FIG. 15B, the data about dots taken charge by the nozzle module is partially replaced with a combination of banding avoiding dot formation pattern data corresponding to the density value of "63", i.e., three types of data each having different pattern size. That is, as an alternative to the original dot formation pattern data, three banding avoiding dot formation patterns of FIGS. 14A to 14C, corresponding to the density value of "63" are disposed to be in a row. These formation patterns have each different pattern size, i.e., "2 dots by 4 dots", "4 dots by 4 dots", and "4 dots by 6 dots". Such replacement through combination of three banding avoiding dot formation pattern data is executed in a similar manner in the combined continuous replacement mode.

As a result of replacement in such a manner as above, as exemplarily shown in FIG. 15B, the three patterns of the same size are not disposed in a row but irregularly.

In the present embodiment, the corresponding nozzle module for the selected pixel data is, basically, four nozzles corresponding to 4 pixel columns in a row in the image data. For example, the printing head 200 carries 18 nozzles as described above, the nozzles are divided into four sets of "0 to 3", "4 to 7", "8 to 11", and "12 to 15" for the selected pixel data, and the pixel data for the remaining nozzles 16 and 17 are neglected for this case.

In the present embodiment, as described above, the selected pixel data is individually replaced with data about dots corresponding to the selected pixel data in the banding avoiding dot formation pattern data depending on the currently-set mode. In the present embodiment, the process is executed on a pixel basis. This is surely not restrictive, and alternatively, the pixel data may be plurally selected for processing at the same-time depending on the pattern sizes of the banding avoiding dot formation pattern data.

When ink deflection occurring to any nozzle in the nozzle module for the selected pixel data is smaller in value than a predetermined value, it is determined that no ink deflection is occurring to the nozzles in the nozzle module for the selected pixel data. Through such a determination, the selected pixel data is determined as not being data for replacement (No in step S308).

When the selected pixel data is not data for replacement, a notification telling as such is made to the N-value process section 11a. Upon reception of such a notification, the N-value process section 11a executes the N-value process to the pixel data in a similar manner to the first embodiment (step S316).

After such replacement process and N-value process are through for every pixel data (Yes in step S312), the resulting image data through with the replacement process and the N-value process is regarded as printing data, and when the printing data is generated as such, this is the end of the printing data generation process (step S314). As such, it is determined that the printing data is generated (step S106), and the printing data is output to the printing section 12 (step S108).

Based on the printing data thus provided by the printing data generation section 11, the printing section 12 uses the black nozzle module 50 to perform dot formation (printing) on a printing medium (step S110). As shown in FIG. 16A or 16B, a dot formation pattern for the part where the banding problem is observed is replaced with a dot formation pattern for banding avoidance. The formation result of FIG. 8B is derived for the case with no consideration for the fact that nozzle N6 is causing ink deflection, i.e., no replacement is performed. From a macroscopic viewpoint, compared with such an ideal printing result of FIG. 8A, the image texture is not smooth that much. However, compared with the printing result of FIG. 8B with no consideration to ink deflection, the phenomenon acknowledged as white and dark streaks can be made less noticeable, thereby improving the image quality in its entirety.

What is better, any replacement-target data is simply replaced with banding avoiding dot formation pattern data that is previously prepared so that banding-free printing data can be generated at high speed.

To be ready for any possible characteristics change occurred to the printing head 200, after the use of the printing device 100, the printing result derived by the printing head 200 may be checked on a regular basis or at a predetermined timing to see the characteristics of the printing head 200 using a unit for reading optical printing results exemplified by a scanner unit. The check result may be stored together with data stored in the replacement information storage section 11d or written over the data for storage. Here, it is understood that the characteristics of the printing head 200 are fixed during manufacturing to some extent, and once manufactured, the characteristics hardly change except when discharge failures such as ink clogging occur, for example. Therefore, in most cases, there is no need to provide a unit for detecting the nozzle characteristics to the respective printing devices if the nozzle characteristics are checked at shipment, and stored in the replacement information storage section 11d in advance.

In the second embodiment above, the image data acquisition section 10 corresponds to the image data acquisition unit of the first or thirty-seventh aspect. The printing data generation section 11 corresponds to any one of the aspects of first, second, third, fourth, sixth, tenth, eleventh, thirty-seventh, thirty-eighth, thirty-ninth, fortieth, forty-second, forty-sixth, and forty-seventh. The printing section 12 corresponds to the printing unit of the first aspect.

In the second embodiment above, step S102 corresponds to the acquiring of any one of the aspects of fourteenth, twenty-sixth, forty-eighth, and sixtieth. Step S104 corresponds to the generating of any one of the aspects of fourteenth, fifteenth, sixteenth, seventeenth, nineteenth, twenty-third, twenty-fourth, twenty-sixth, twenty-seventh, twenty-eighth, twenty-ninth, thirty-first, thirty-fifth, thirty-sixth, forty-eighth, forty-ninth, fiftieth, fifty-first, fifty-third, fifty-seventh, fifty-eighth, sixtieth, sixty-first, sixty-second, sixty-third, sixty-fifth, sixty-ninth, and seventieth. Step S110 corresponds to the printing of the fourteenth or twenty-sixth aspect.

Third Embodiment

Figure 17:
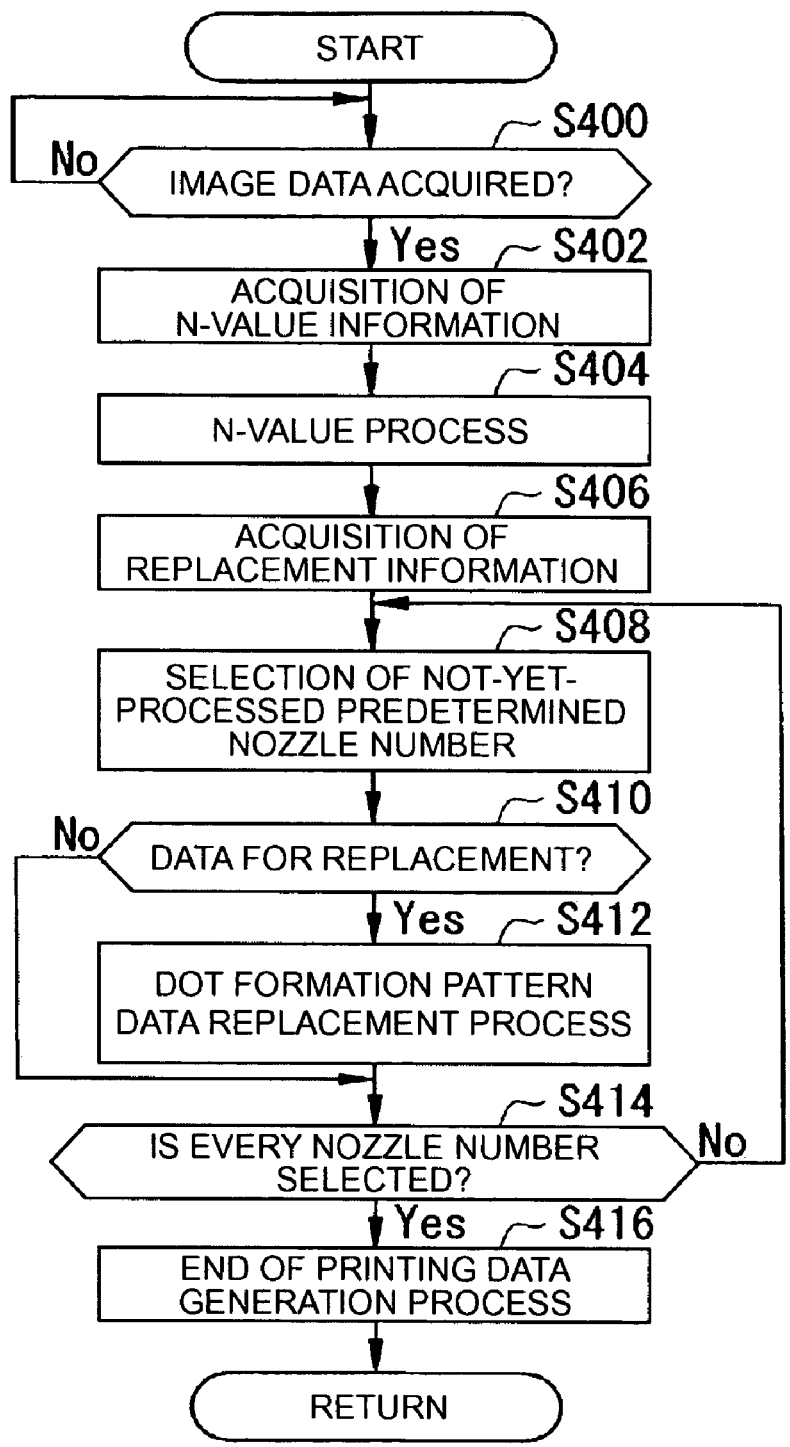
FIG. 17 is a flowchart of a printing data generation process in the printing data generation section 11 of the printing device 100.
Figure 18:
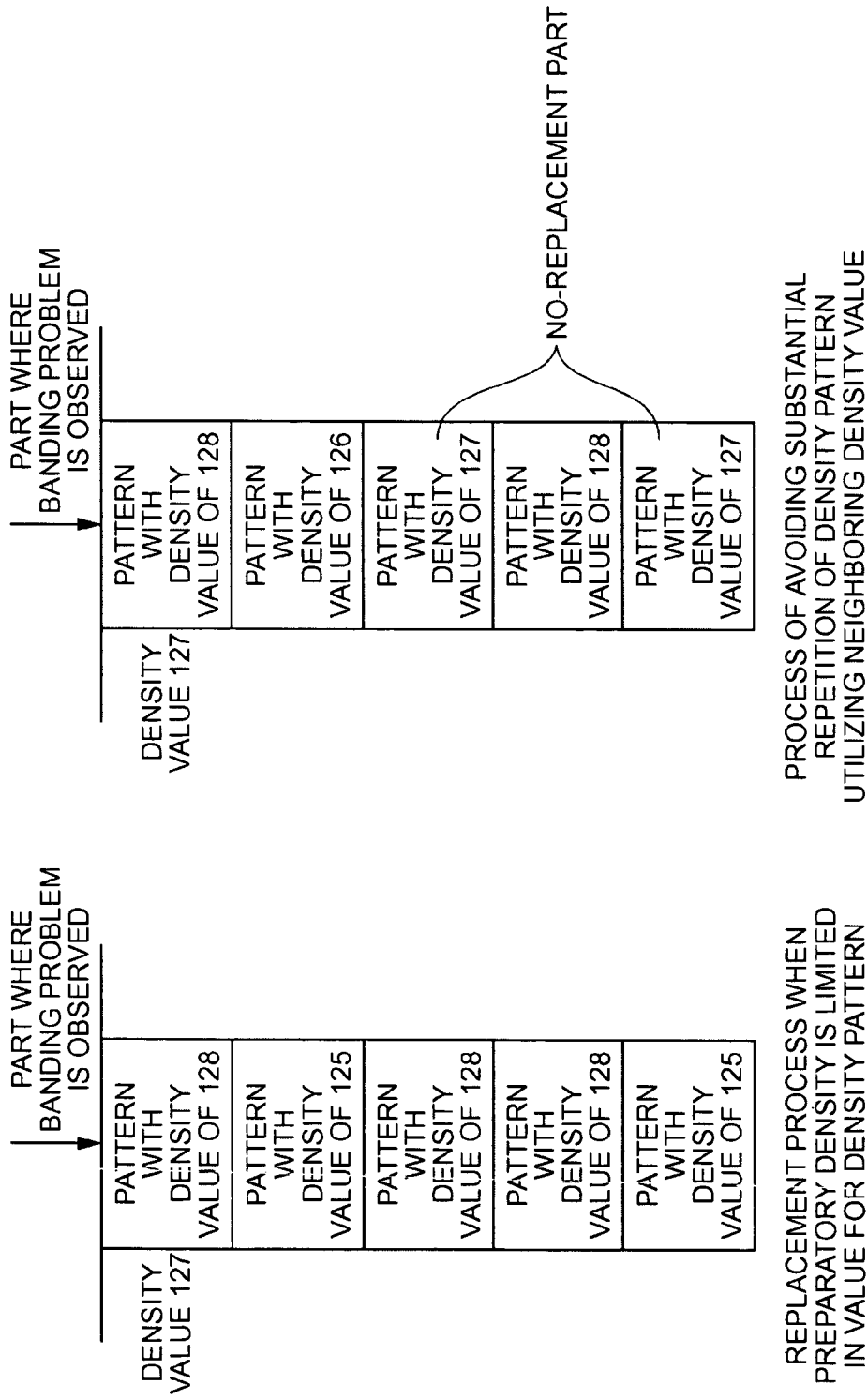
FIG. 18A is a diagram showing an exemplary replacement pattern in a combined continuous replacement mode 2.
FIG. 18B is diagram showing an exemplary replacement pattern in a combined decimation replacement mode.
Figure 19:
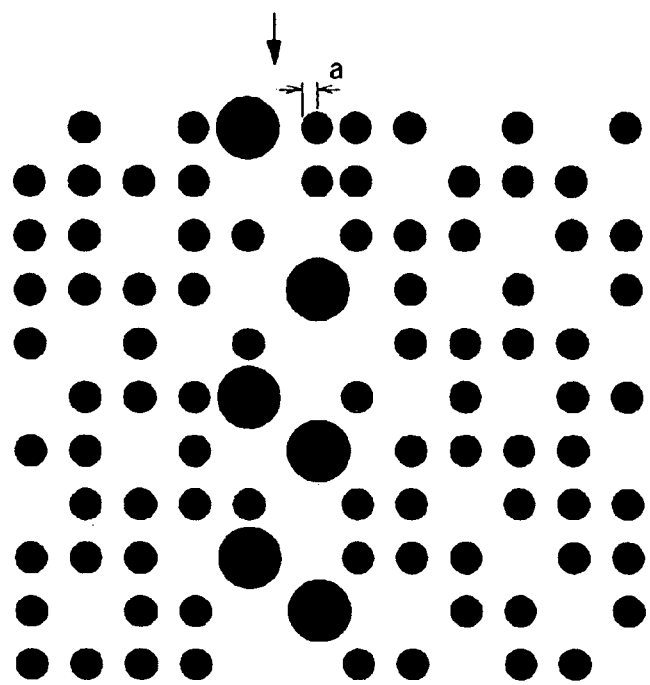
FIG. 19 is a diagram showing an exemplary dot pattern that is formed based on printing data generated with consideration of ink deflection observed to the nozzle N6.

Described next is a third embodiment of the invention by referring to the accompanying drawings. FIGS. 17 to 19 are all a diagram showing the third embodiment of the invention, i.e., a printing device, a printing device control program and method, and a printing data generation device, program, and method.

In the third embodiment, the printing device and the computer system both are in the similar configuration as those in the first embodiment shown in FIGS. 1 and 2. The third embodiment is different from the first embodiment in the respect that the printing data generation process in step S104 of FIG. 5 is replaced with the process of FIG. 17.

Although the printing data generation process of FIG. 17 is the same as that of the first and second embodiments in principle, differences lie in the following respects. That is, a replacement process is executed after an N-value process, and banding avoiding dot formation pattern data for use of replacement based on nozzle information is different in details and replacement manner. In the below, described are only such differences from the first and second embodiments, avoiding redundant description.

By referring to FIG. 17, described next in detail is a printing data generation process of step S104 in the present embodiment.

FIG. 17 is a flowchart of a printing data generation process in the printing data generation section 11 of the printing device 100.

In the printing data generation process, data about dots taken charge by a nozzle relating to a banding problem is replaced with banding avoiding dot formation pattern data that is provided in advance so that printing data is generated. After such a printing data generation process is executed in step S104, as shown in FIG. 17, the procedure first goes to step S400.

In step S400, the N-value process section 11a determines whether image data through with CMYK conversion is provided by the image data acquisition section 10. When the determination is made as Yes, the procedure goes to step S402. When not (No), the determination process is repeated until the CMYK-converted image data is acquired.

In step S402, the N-value process section 11a acquires N-value information needed for the N-value process from the N-value information storage section 11b, and the procedure goes to step S404.

In step S404, the N-value process section 11a applies the N-value process with respect to the image data acquired in step S400. The resulting image data through with the N-value process is forwarded to the dot formation pattern replacement section 11c, and the procedure goes to step S406.

In step S406, the dot formation pattern replacement section 11c acquires replacement information from the replacement information storage section 11d. The procedure then goes to step S408.

The replacement information in the present embodiment includes information indicating whether the nozzles provided to the printing head 200 have something to do with the banding problem on a nozzle number basis. When any of the nozzles is relating to the banding problem, the replacement information also includes banding avoiding dot formation pattern data for the nozzle number.

In the present embodiment, unlike the first embodiment, the banding avoiding dot formation pattern data is not provided for every tone of the image data as a processing target. Alternatively, assuming that a possible density value range is from 0 to 255, the banding avoiding dot formation pattern data may be provided only to even density values such as "2", "4", "6", . . . "252", and "254". For the remaining odd density values, the banding avoiding dot formation pattern data may be provided for a part of the tone values, e.g., a combination of the even density values will do. For the dot formation patterns corresponding to the remaining density values for replacement, the banding avoiding dot formation pattern data provided for the density values will be combined together as appropriate for replacement. In such a manner, the banding avoiding dot formation pattern data can be reduced in number that will be a lot depending on the tone range, thereby favorably reducing the memory capacity needed for the data.

In step S408, the dot formation pattern replacement section 11c makes a selection from the replacement information acquired in step S406 for any nozzle number that is not yet through with the replacement process, and is corresponding to printing of the image data, and the procedure goes to step S410.

In step S410, the dot formation pattern replacement section 11c determines whether the data about dots taken charge by the nozzle number selected in step S204 is data for replacement. When the determination is made as Yes, the procedure goes to step S412, and when not (No), the procedure goes to step S414.

In step S412, the dot formation pattern replacement section 11c goes through a process of replacing the dot data for the nozzle number in the N-valued image data for replacement with banding avoiding dot formation pattern data for the dithering level of the dot formation pattern of the data. The procedure then goes to step S414.

In the present embodiment, two processing modes are available for selection. One processing mode is of replacing data about dots corresponding to a nozzle relating to a banding problem entirely with banding avoiding dot formation pattern data. Such a mode is hereinafter referred to as combined continuous replacement mode. The other processing mode is of partially replacing the data, and such a mode is hereinafter referred to as combined decimation replacement mode. In the combined decimation replacement mode, the dots including any replacement object are represented by density values utilizing the banding avoiding dot formation pattern data that is previously provided for a part of the density values, and the density value for the dot parts not to be replaced.

In step S414, the dot formation pattern replacement section 11c determines whether every nozzle number in the image data is selected. When the determination is made as Yes, the procedure goes to step S416, and when not (No), the procedure goes to step S408.

In step S416, the printing data generation section 11 ends the printing data generation process, and the procedure returns.

Described next is the operation of the present embodiment by referring to FIGS. 18A to 19.

FIG. 18A is a diagram showing an exemplary replacement pattern in a combined continuous replacement mode 2. FIG. 18B is diagram showing an exemplary replacement pattern in a combined decimation replacement mode. FIG. 19 is a diagram showing an exemplary dot pattern that is formed based on printing data generated with consideration of ink deflection observed to the nozzle N6.

Also in the present embodiment, as shown in FIG. 8B of the first embodiment, ink deflection is observed to the nozzle N6 in the black nozzle module 50. In the dot pattern, the dots formed by the nozzle N6 are displaced by the distance a toward the dots formed by the correct nozzle N7 on the right side. As a result, a white streak is observed between the dots formed by the nozzle N6 and the dots formed by the nozzle N5 on the left side.

In the present embodiment, the printing data generation process is started in response when the N-value process section 11a determines that the image data is acquired (step S400). The N-value process section 11a also reads out N-value information from the N-value information storage section 11b for storage into a predetermined region of RAM 62 so tat the N-value information is acquired (step S402).

After acquiring N-value information, the N-value process section 11a applies the N-value process similarly to the first embodiment to the image data based on the N-value information. The resulting image data through with the N-value process is forwarded to the dot formation pattern replacement section 11c (step S404).

After acquiring the N-valued image data from the N-value process section 11a, the dot formation pattern replacement section 11c reads out replacement information from the replacement information storage section 11d for storage into a predetermined region of the RAM 62 so that the replacement information is acquired (step S406). The replacement information includes information about whether each nozzle number is relating to a banding problem, and banding avoiding dot formation pattern data. In the present embodiment, similarly to the data for use of forming the banding avoiding dot formation patterns as shown in FIGS. 9A and 9B in the first embodiment, the banding avoiding dot formation pattern data is provided for each density value, and is used to form a dot formation pattern for a dot part of 4 dots by 4 dots.

In the present embodiment, in the combined continuous replacement mode 2, the banding avoiding dot formation pattern data is provided for the density values in a possible range from 0 to 255, e.g., "1", "4", "7", . . . "125", "128", . . . , "252" and "255". In the combined decimation replacement mode, the banding avoiding dot formation pattern is provided for the even density values in a possible range from 0 to 255.

The dot formation pattern replacement section 11c makes a selection from the replacement information stored in the RAM 62 for any nozzle number assigned to the nozzle for use of printing the image data based on the acquired N-valued image data (step S408). The dot formation pattern replacement section 11c then determines whether or not the dot data for the nozzle of the nozzle number is to be replaced as is having something to do with a banding problem (step S410).

In the present embodiment, similarly to the first embodiment, basically, the nozzle numbers to be selected are those four nozzle numbers corresponding to four pixel columns in a row around a portion where the banding problem is observed in the image data.

When the dot formation pattern replacement section 11c determines that the dot data for the nozzle of the selected nozzle number is to be replaced (Yes in step S410), the replacement process is executed depending on the user-set mode, i.e., either the combined continuous replacement mode 2 or the combined decimation replacement mode (step S412).

If the density value of the dot formation pattern for the nozzle selected for replacement is "127" in the combined continuous replacement mode 2, as shown in FIG. 18A, the dot formation pattern data for the selected nozzle is entirely replaced with a combination of the banding avoiding dot formation pattern data for the density values "125" and "128". That is, as an alternative to the original dot formation pattern data, the banding avoiding dot formation patterns are alternately disposed. The banding avoiding dot formation patterns are both of 4 dots by 4 dots, respectively corresponding to two density values of "125" and "128", the average value of which is "127".

In an exemplary case where the dot formation pattern for the nozzle selected for replacement has the density value of "127" in the combined decimation replacement mode, as shown in FIG. 18B, the dot formation pattern data for the selected nozzle is partially replaced, and the remaining portions are not replaced. At this time, the replacing portion is replaced with a combination of the banding avoiding dot formation pattern data corresponding to the density values of "128" and "126". This replacement is performed in such a manner that the density value of the dot formation pattern will be entirely "127", being an average of the density value of the replacing portion, and the density value "127" of no-replacement portions. That is, as an alternative to the original dot data for replacement, used are two of the banding avoiding dot formation patterns of 4 dots by 4 dots for the density value of "128", and one of the banding avoiding dot formation pattern data of 4 dots by 4 dots for the density value of "126". As such, in combination of the density value of "127" of the dot formation pattern for the no-replacement portions, replacement is so performed as to derive the density value of "127" for the dot formation pattern in its entirety.

When the dot data for the selected nozzle number is determined as not being the data for replacement (No in step S410), another determination is made whether there is any not-yet-processed nozzle number in the replacement information (step S414). When the determination is made as Yes (No in step S414), the not-yet-processed nozzle number is selected (step S408), and the determination process is executed (step S410) so that the determination result derived thereby is used as a basis for process execution thereafter.

After the determination process and the replacement process are through for dot data for every nozzle number (Yes in step S414), the resulting image data through with the replacement process is regarded as printing data, and when the printing data is generated as such, this is the end of the printing data generation process (step S416). As such, it is determined that the printing data is generated (step S106), and the printing data is output to the printing section 12 (step S108).

Based on the printing data thus provided by the printing data generation section 11, the printing section 12 uses the black nozzle module 50 to perform dot formation (printing) on a printing medium (step S110). As shown in FIG. 19A, a dot formation pattern for the part where the banding problem is observed is replaced with a dot formation pattern for banding avoidance. From a macroscopic viewpoint, compared with such an ideal printing result of FIG. 8A, the image texture is not smooth that much. However, compared the dot formation result in the case where a normal printing data is generated with no consideration for the fact that nozzle N6 is causing ink deflection as shown in FIG. 8B, i.e., no replacement is performed, the phenomenon acknowledged as white and dark streaks can be made less noticeable, thereby improving the image quality in its entirety.

In the third embodiment above, the image data acquisition section 10 corresponds to the image data acquisition unit of the first or thirty-seventh aspect. The printing data generation section 11 corresponds to any one of the aspects of first, second, third, fourth, fifth, sixth, seventh, tenth, eleventh, thirty-seventh, thirty-eighth, thirty-ninth, fortieth, forty-first, forty-second, forty-third, forty-sixth, and forty-seventh. The printing section 12 corresponds to the printing unit of the first aspect.

In the third embodiment above, step S102 corresponds to the acquiring in any one of the aspects of fourteenth, twenty-sixth, forty-eighth, and sixtieth. Step S104 corresponds to the generating in any one of the aspects of fourteenth, fifteenth, sixteenth, seventeenth, eighteenth, nineteenth, twentieth, twenty-third, twenty-fourth, twenty-sixth, twenty-seventh, twenty-eighth, twenty-ninth, thirtieth, thirty-first, thirty-second, thirty-fifth, thirty-sixth, forty-eighth, forty-ninth, fiftieth, fifty-first, fifty-second, fifty-third, fifty-fourth, fifty-seventh, fifty-eighth, sixtieth, sixty-first, sixty-second, sixty-third, sixty-fourth, sixty-fifth, sixty-sixth, sixty-ninth, and seventieth. Step S110 corresponds to the printing in the fourteenth or twenty-sixth aspect.

Figure 20:
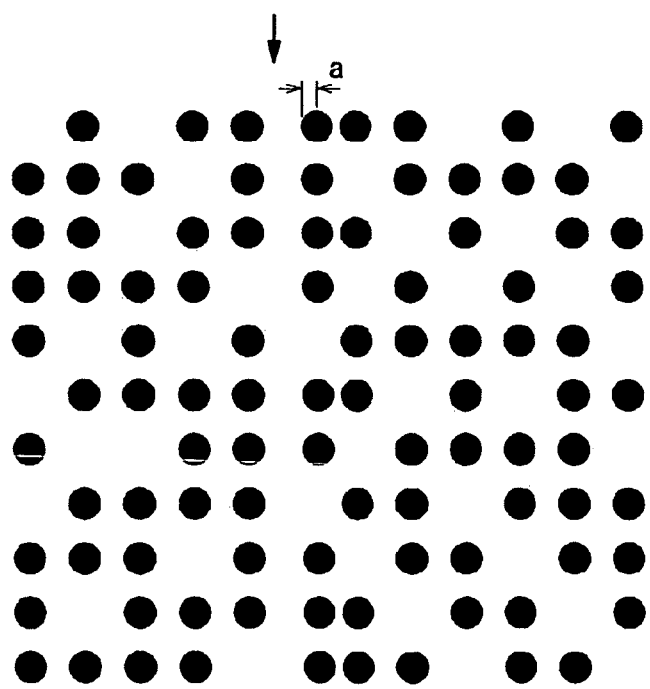
FIG. 20 is a diagram showing an exemplary dot pattern that is formed based on printing data generated with consideration of ink deflection observed to the nozzle N6 in a case where the nozzles N are only capable of forming dots of a size.

In the printing device 100 of the first to third embodiments above, three dots sizes are possibly formed except for "no dot formation". This is surely not restrictive, and even if the printing device 100 is capable of forming one dot size except for "no dot formation", a banding avoiding dot formation pattern including dots of a size is provided. A dot formation pattern for a nozzle causing ink deflection of FIG. 8B is replaced with the banding avoiding dot formation pattern of FIG. 20. As a result, in comparison with the printing result of the dot pattern of FIG. 8B, the phenomenon visually acknowledged as white and dark streaks can be made less noticeable so that the image quality can be increased in its entirety.

The printing devices of the first to third embodiments are characterized in the respect that image data is converted into printing data with consideration given to the characteristics of a printing head without tailoring any existing printing device. Accordingly, there is no need to provide any specific component serving as the printing section 12, but an ink jet printer that has been on the market can be used as it is. What is more, by separating the printing section 12 from the printing devices 100 of the first to third embodiments, the component function can be implemented only by any general-purpose printing command terminal (printing data generation unit) such as PCs.

Not only to an ink deflection problem, the invention is surely applicable also to a problem of causing the same phenomenon as the ink deflection to dots to be formed, which is resulted from the nozzles not at their ideal positions even if the ink discharge direction is perpendicular, i.e., correct.

The printing devices 100 of the first to third embodiments are applicable not only to line-head ink jet printers but also to multi-path ink jet printers. With the line-head ink jet printers, even if an ink deflection problem is observed, the printing result can be derived by a single path with the high quality of white or dark streaks hardly noticeable. With the multi-path ink jet printers, the frequency of the reciprocating operation can be reduced so that the higher-speed printing can be achieved.

Figure 21A:
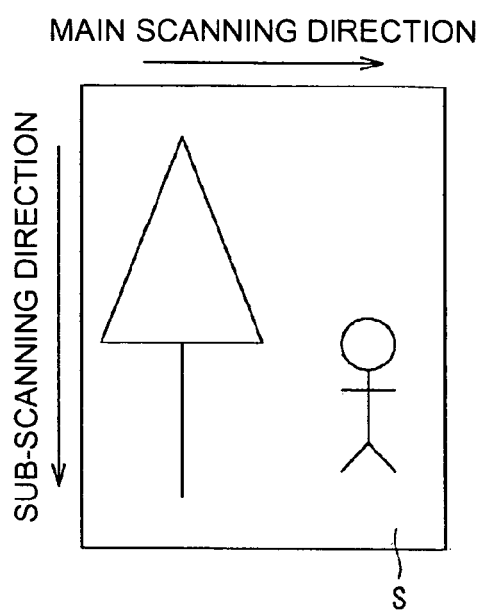
FIGS. 21A to 21C are all a diagram illustrating printing scheme differences between a multi-path ink jet printer, and a line head ink jet printer.
Figure 21B:
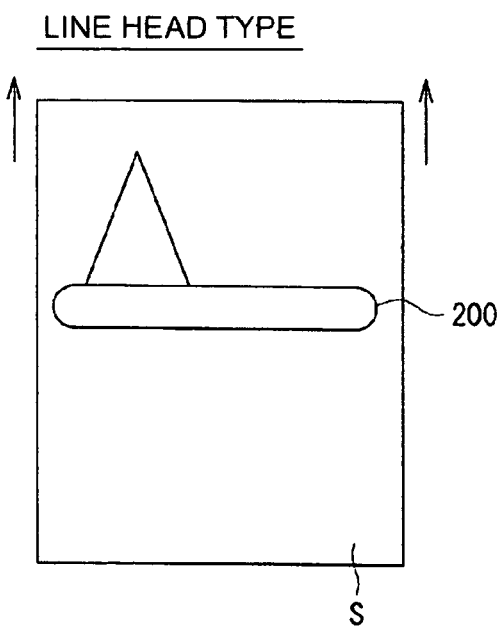
Figure 21C:
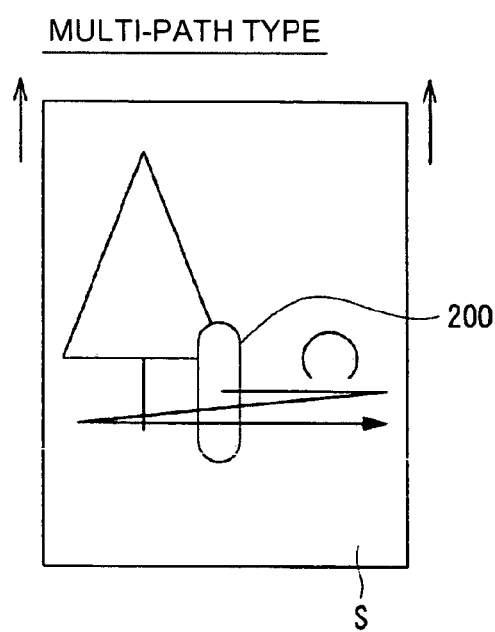

FIGS. 21A to 21C are all a diagram illustrating a printing scheme of a line-head ink jet printer, and that of a multi-path ink jet printer.

As shown in FIG. 21A, it is assumed that the width direction of a rectangular printing medium (paper) S is the main scanning direction of the image data, and the longitudinal direction of the printing medium (paper) S is the sub scanning direction of the image data. By referring to FIG. 21B, the line-head ink jet printer is provided with the printing head 200 having the width of the printing medium (paper) S. The printing head 200 is fixed, and the printing medium (paper) S is moved with respect to the printing head 200 in the sub scanning direction so that the printing can be completed with a single path, i.e., a single operation. Alternatively, as a flat-head scanner, the printing medium (paper) S may be fixed, and the printing head 200 may be moved in the sub scanning direction. Still alternatively, both the printing medium and the printing head may be moved in each opposite direction for printing. On the other hand, as shown in FIG. 21C, the multi-path ink jet printer is provided with the printer head 200 being rather short in width compared with the paper width. Such a printing head 200 is positioned in the direction orthogonal to the main scanning direction of the image, and is frequently reciprocated in the main scanning direction of the image so that the printing medium (paper) S is moved in the sub scanning direction of the image by a predetermined pitch for printing. As such, although the multi-path ink jet printer has a drawback of taking longer printing time compared with the line-head ink jet printer, it also has an advantage of correcting the above-described banding problem, specifically white streaks, to some extent due to its configuration of possibly placing the printing head 200 at any arbitrary position.

Exemplified in the above first to third embodiments is an ink jet printer that performs printing by discharging ink in dots. This is not restrictive, and the invention is surely applicable to any other types of printing device using a printing head provided with printing mechanisms in line, or thermal head printers called thermal transfer printers, thermal printers, and the like.

Figure 22:
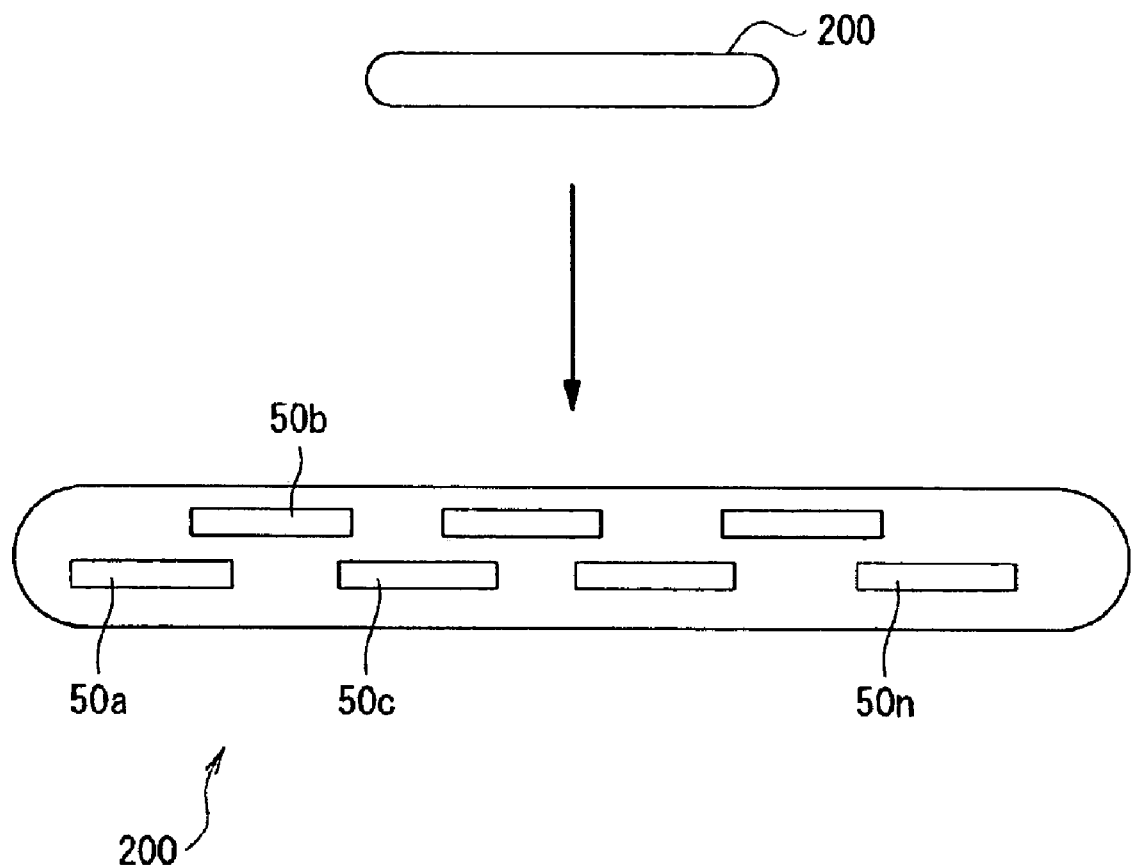
FIG. 22 is a conceptual diagram of another exemplary configuration of a printing head.

FIG. 3 shows the printing head 200 including the nozzles modules 50, 52, 54, and 56, discharging their corresponding color, and the nozzle modules each carry nozzles N in line in the longitudinal direction of the printing head 200. As shown in FIG. 22, alternatively, the nozzle modules 50, 52, 54, and 56 may be configured by a plurality of short-length nozzle units 50a, 50b, . . . 50n, those of which are arranged in the movement direction of the printing head 200. Especially if the nozzle modules 50, 52, 54, and 56 are each configured by such short-length nozzle units 50a, 50b, . . . 50n, any long-length nozzle module can be configured by using such short-length nozzle units 50a, 50b, . . . , 50n. This favorably leads to a higher manufacturing yield for the nozzle modules.

What is claimed is:

1. A printing device that prints an image by forming a dot formation pattern on a printing medium in accordance with image data of a printing object using a printing head that includes a plurality of nozzles each being capable of forming dots to the printing medium, the printing device comprising:
   an image data acquisition unit that acquires the image data showing pixel values of M (M≧2) for the image;
   a dot formation pattern data storage unit that stores banding avoiding dot formation pattern data for forming a dot formation pattern for banding avoidance use that includes the dots each being correlated to information about any of the nozzles relating to a banding problem;
   a printing data generation unit that generates printing data as a result of converting the image data into dot formation pattern data for use of forming a printing image of the image data on the printing medium; and
   a printing unit that prints, based on the printing data, the printing image of the image data onto the printing medium using the printing head, wherein
   based on the image data, and the dot formation pattern data stored in the dot formation pattern data storage unit, the printing data generation unit generates the printing data by replacing data in the image data about the dots taken charge by the nozzle relating to the banding problem with the banding avoiding dot formation pattern data for the nozzle, for a predetermined dithering level, the dot formation pattern data storage unit stores a group of the banding avoiding dot formation pattern data each including data about a dot formation pattern, the printing data generation unit replaces the dot formation pattern data with two or more of the dot formation pattern data selected from the group of the dot formation pattern data, and the group of the dot formation pattern data is of the same pattern size but of different dot formation details, such that, for representation of a specific dithering level, the group of the dot formation pattern data share the same number of dots and area size for dot formation but are different only in dot formation position.

2. The printing device according to claim 1, wherein the banding avoiding dot formation pattern data is generated on a dithering level basis, and based on a dithering level of the dot formation pattern for the image data including the dots taken charge by the nozzle relating to the banding problem, the printing data generation unit replaces data about the dot formation pattern with the dot formation pattern data for the dithering level.

3. The printing device according to claim 2, wherein when the dot formation pattern data storage unit is not storing the banding avoiding dot formation pattern data corresponding to the dithering level of the dot formation pattern for the image data including the dots taken charge by the nozzle relating to the banding problem, the printing data generation unit replaces the data about the dot formation pattern for the nozzle relating to the banding problem with two or more of the banding avoiding dot formation pattern data whose dithering levels are different.

4. The printing device according to claim 1, wherein the banding avoiding dot formation pattern data is generated on a dithering level basis, and based on a tone value of the image data corresponding to the nozzle relating to the banding problem, the printing data generation unit replaces the image data with the dot formation pattern data for the dithering level.

5. The printing device according to claim 1, wherein the printing data generation unit partially replaces, with the banding avoiding dot formation pattern data, the data in the image data about the dots taken charge by the nozzle relating to the banding problem or the image data.

6. The printing device according to claim 5, wherein the printing data generation unit searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in such a manner that the dot formation patterns of a kind are not arranged in a row, disposes the selected banding avoiding dot formation pattern data as a replacement for the data in the image data about the dots taken charge by the nozzle relating to the banding problem.

7. The printing device according to claim 1, wherein the printing data generation unit searches the banding avoiding dot formation pattern data in the dot formation pattern data storage unit including the group of the banding avoiding dot formation pattern data each including the data about the dot formation pattern for a random selection of two or more of the banding avoiding dot formation pattern data, and in order of selection, disposes the selected banding avoiding dot formation pattern data as a replacement for the data in the image data about the dots taken charge by the nozzle relating to the banding problem.

8. The printing device according to claim 1, wherein the printing head is configured by the nozzles successively disposed over a region wider than a region with the printing medium being attached.

9. The printing device according to claim 1, wherein the printing head takes charge of printing while reciprocating in a direction perpendicular to a paper feeding direction of the printing medium.

10. The printing device according to claim 1, wherein the printing unit prints the printing image by forming dots of the same size but of different density.

11. The printing device according to claim 1, wherein the printing unit prints the printing image by changing the frequency of ink of the same density.

12. A printing device control program for use of controlling a printing device that prints an image by forming a dot formation pattern on a printing medium in accordance with image data of a printing object using a printing head that includes a plurality of nozzles each being capable of forming dots to the printing medium, the printing device control program comprising, for program execution by a computer:

acquiring the image data showing pixel values of M (M≧2) for the image;

generating printing data as a result of converting the image data into dot formation pattern data for use of forming a printing image of the image data on the printing medium; and printing, based on the printing data, the printing image of the image data onto the printing medium using the printing head, wherein based on the image data, and dot formation pattern data for forming a dot formation pattern for banding avoidance use that includes the dots each being correlated to information about any of the nozzles relating to a banding problem, the generating generates the printing data by replacing data in the image data about the dots taken charge by the nozzle relating to the banding problem with the banding avoiding dot formation pattern data for the nozzle, for a predetermined dithering level, the dot formation pattern data storage unit stores a group of the banding avoiding dot formation pattern data each including data about a dot formation pattern, the printing data generation unit replaces the dot formation pattern data with two or more of the dot formation pattern data selected from the group of the dot formation pattern data, and the group of the dot formation pattern data is of the same pattern size but of different dot formation details, such that, for representation of a specific dithering level, the group of the dot formation pattern data share the same number of dots and area size for dot formation but are different only in dot formation position.

* * * * *